United States Patent [19]

Tsune

[11] Patent Number: 4,579,026
[45] Date of Patent: Apr. 1, 1986

[54] BAND SAW MACHINE AND METHOD FOR CUTTING A STOCK WITH SUCH MACHINE

[75] Inventor: Ryoichi Tsune, Toyama, Japan

[73] Assignee: Tsune Seiki Kabushiki Kaisha, Toyama, Japan

[21] Appl. No.: 659,324

[22] Filed: Oct. 10, 1984

[30] Foreign Application Priority Data

Jul. 13, 1984 [JP] Japan ................................ 59-146336
Jul. 13, 1984 [JP] Japan ................................ 59-146337
Jul. 13, 1984 [JP] Japan ................................ 59-146338
Jul. 13, 1984 [JP] Japan ................................ 59-146339
Jul. 13, 1984 [JP] Japan ........................... 59-106932[U]

[51] Int. Cl.$^4$ ............................................. B23D 53/04
[52] U.S. Cl. ........................................... 83/13; 83/72; 83/789; 83/798; 83/801; 83/812
[58] Field of Search ................. 83/801, 788, 746, 747, 83/794, 796, 798, 789, 791, 812, 809, 642, 644, 800, 56, 71, 13, 72; 125/11 R, 21

[56] References Cited

U.S. PATENT DOCUMENTS 4,369,686  1/1983  Sugimoto ........................... 83/801 X
4,478,120 10/1984  Sugimoto ................................ 83/71
4,487,097 12/1984  Hara et al. ........................ 83/801 X Primary Examiner—Frank T. Yost
Attorney, Agent, or Firm—Koda and Androlia

[57] ABSTRACT

A band saw machine which comprises a generally elongated frame structure including an endless band saw trained between and adapted to travel over a pair of spaced guide wheels and having cutting and return reaches therebetween, a positioning mechanism for fixedly supporting a stock to be cut, and a rocking mechanism including a pair of spaced reciprocating drives for rocking the endless band saw through a predetermined angle in the opposite directions generally about the stock to be cut, with the opposite ends of the frame structure alternately upwardly and downwardly shifted. The frame structure is supported for movement relative to the positioning mechanism between inoperative and cutting positions in a direction generally perpendicular to the stock. The rocking mechanism is operable at least during the cutting operation performed by the cutting reach of the endless band saw.

6 Claims, 22 Drawing Figures

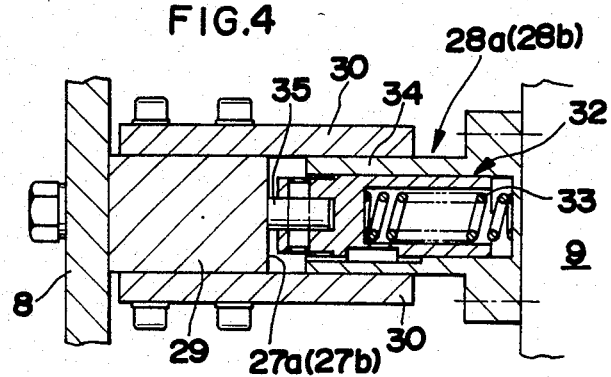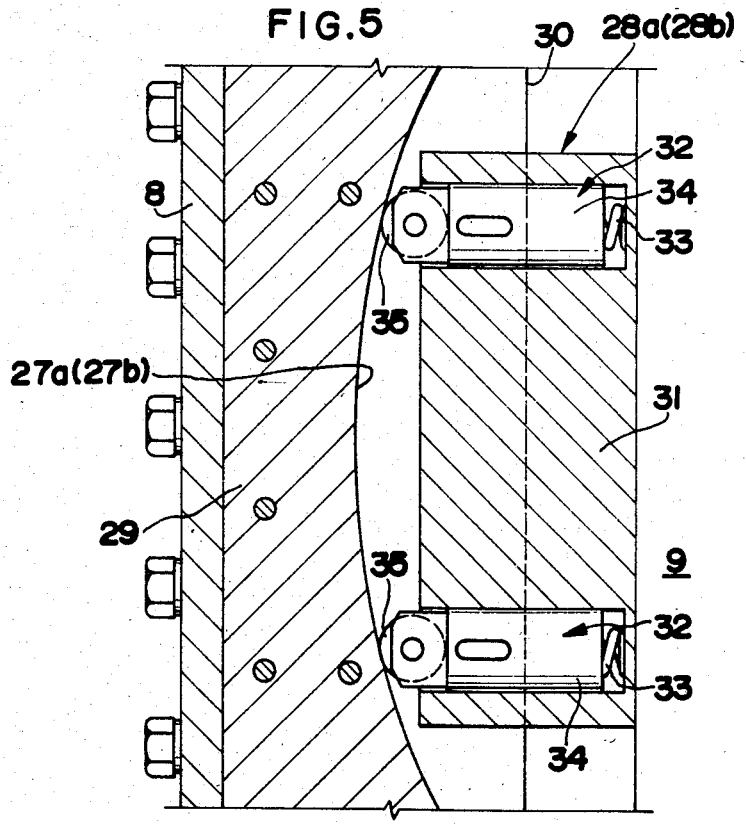

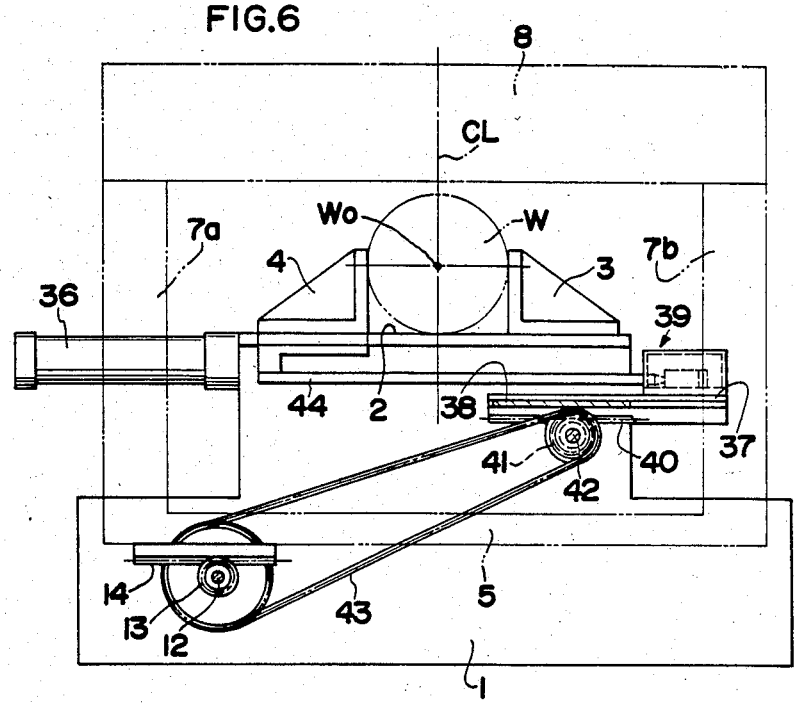
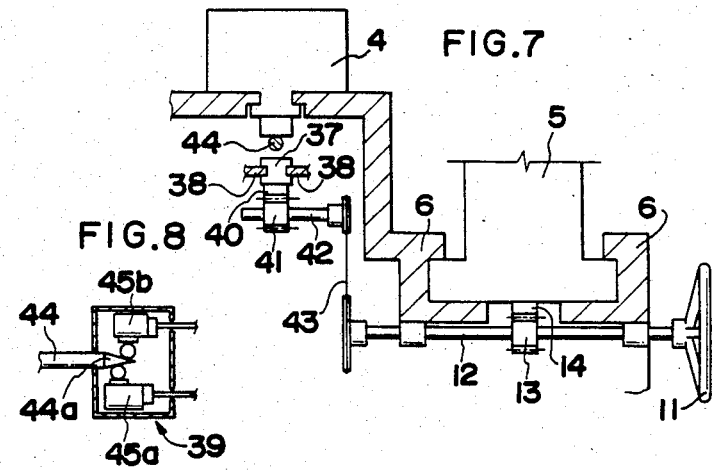

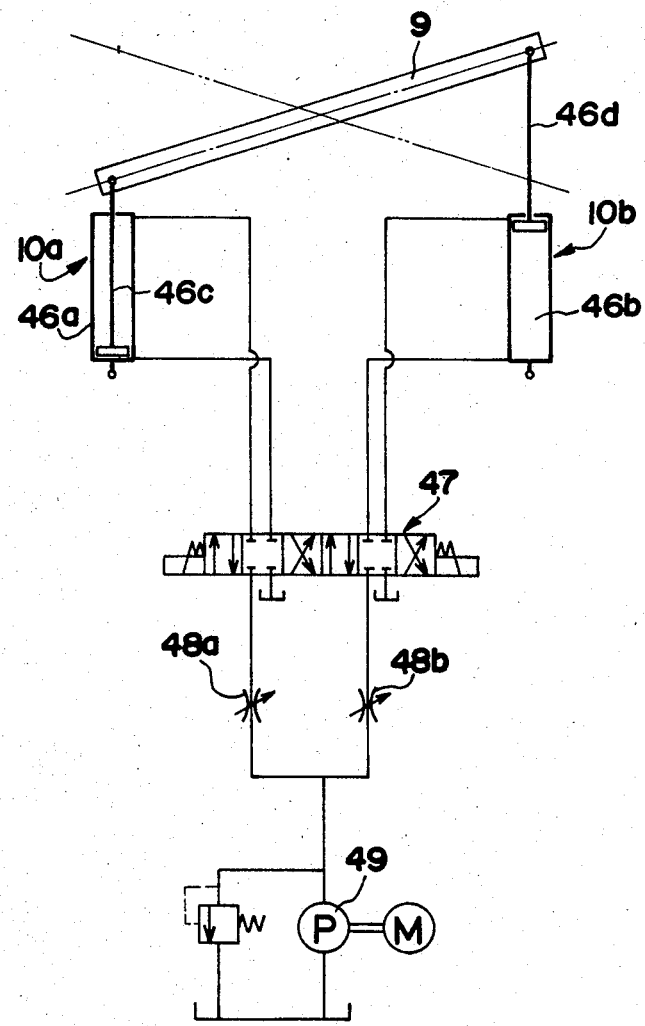

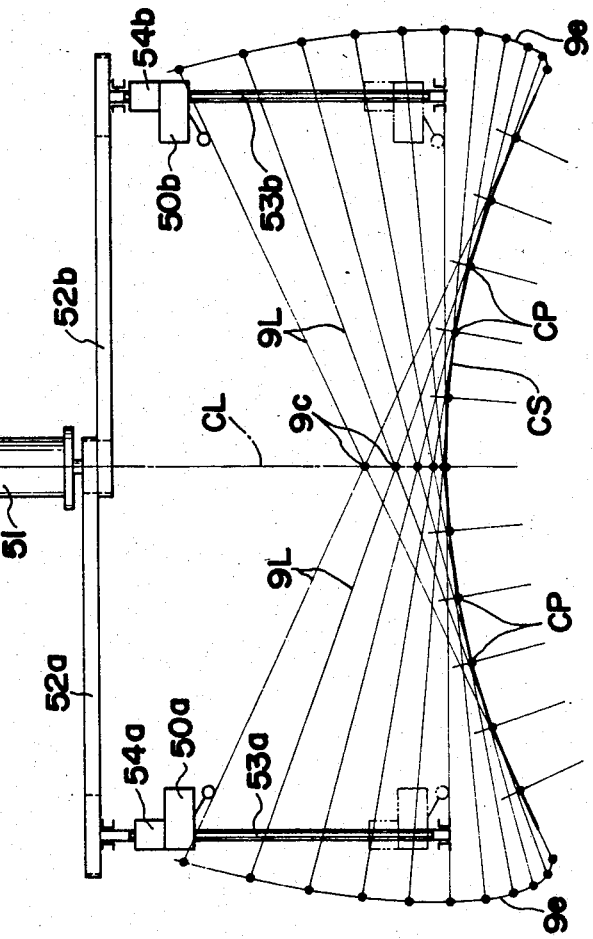

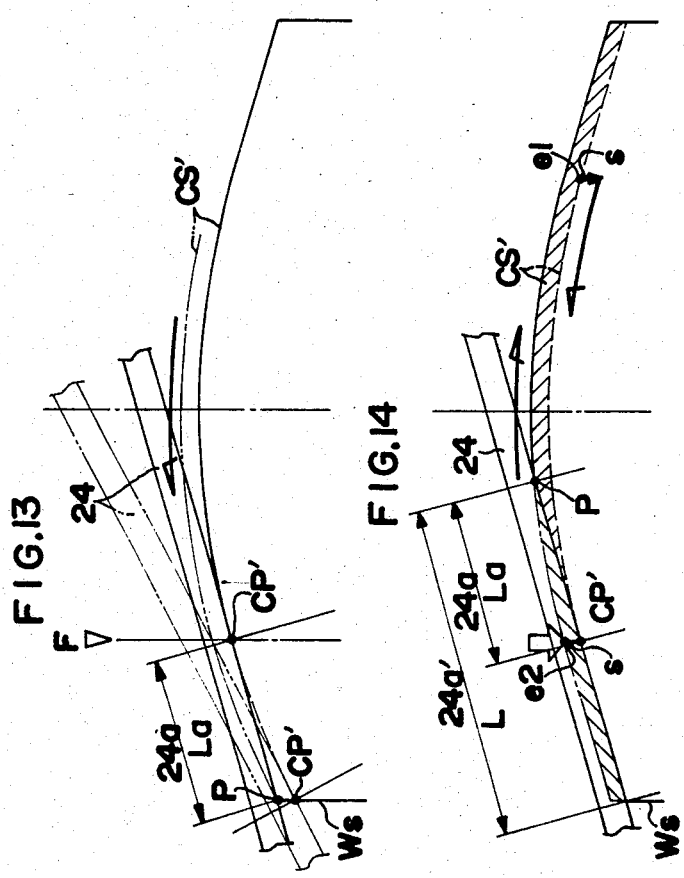

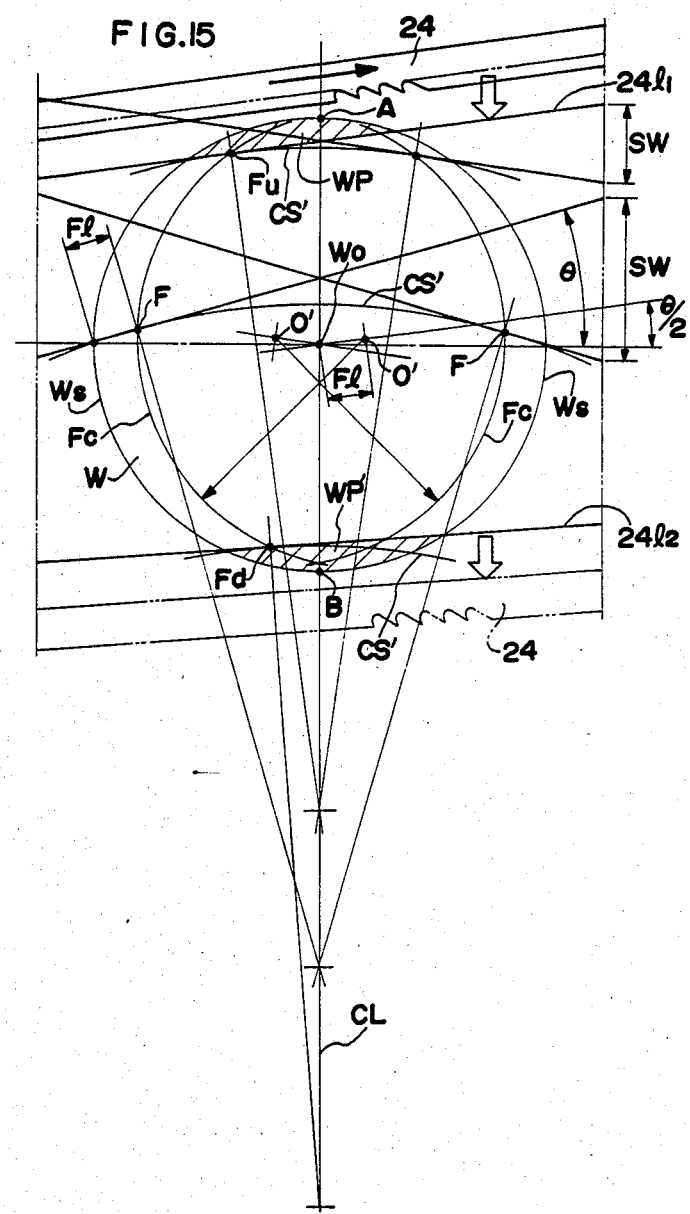

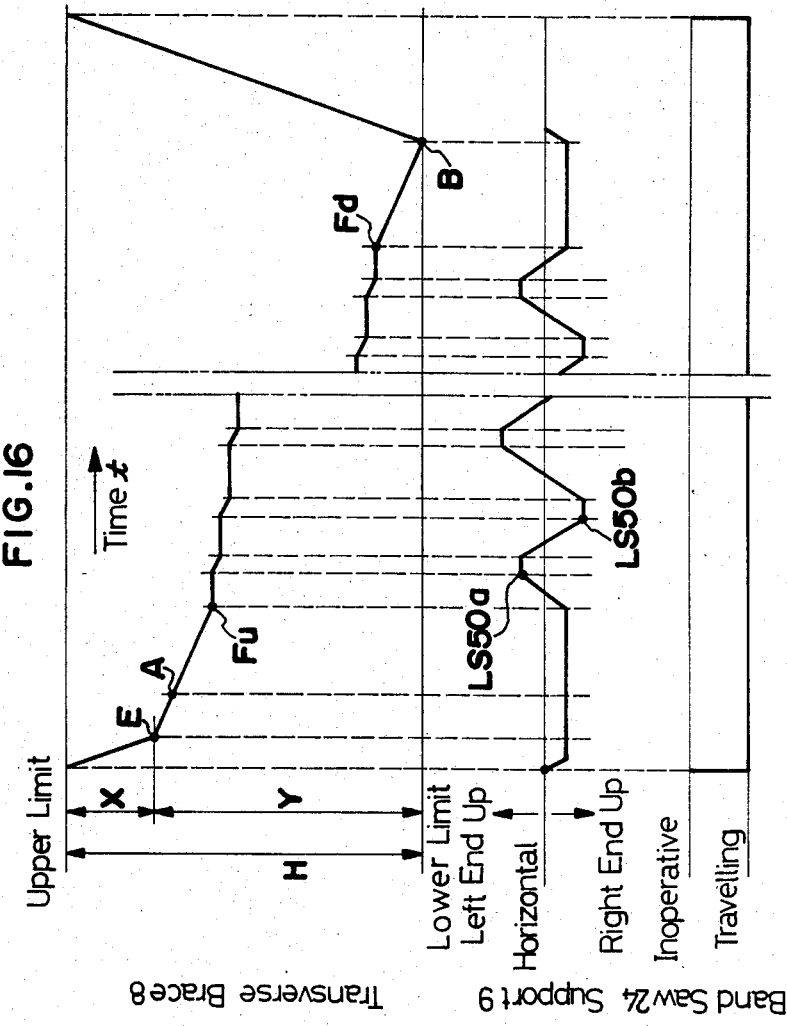

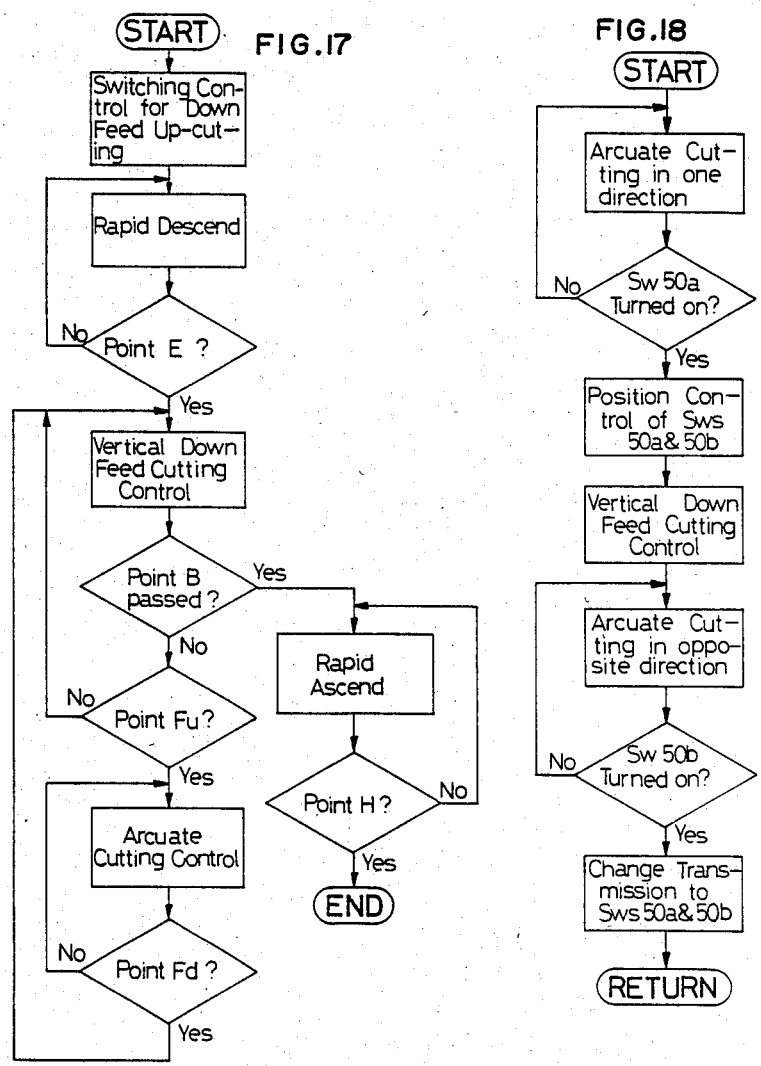

BAND SAW MACHINE AND METHOD FOR CUTTING A STOCK WITH SUCH MACHINE

BACKGROUND OF THE INVENTION

The present invention generally relates to a band saw machine and, more particularly, to a band saw machine of a type wherein an endless band saw and a stock to be cut are supported for movement relative to each other for effecting the cutting to the stock. The present invention also relates to a method for cutting the stock with the use of the band saw machine.

The band saw machine to which the present invention pertains includes both a type wherein the endless band saw is supported for movement in a direction close towards and away from the stock to be cut and a type wherein the stock is supported for movement in a direction close towards and away from the endless band saw. The first mentioned type is referred to as a saw feed type whereas the second mentioned type is referred to as a stock feed type.

When it comes to the cutting of a stock, for example, a round bar, with the use of the band saw machine of the type referred to above, it is well known that the cutting length of the band saw is minimum at the start and the finish and maximum at the center of the round bar. When the cutting length is small, the band saw is excessively loaded at a local area and the stress built-up takes place at such local area of the band saw, whereas when the cutting length is great and particularly when the cutting is effected at the same speed as that used during the cutting while the cutting length is small, a cutting zone of the band saw is susceptible to an excessive bending stress which ultimately brings about the undue bending of the band saw and, possibly, the breakage of the band saw. Accordingly, it is a general practice that, as the cutting length becomes great, the feed speed of the band saw is reduced to lessen the load acting on the band saw. However, it is also well known that, when the feed speed is reduced in the manner as hereinabove described, saw teeth of the band saw tend to undergo friction relative to the stock being cut and/or the band saw travelling in one direction is susceptible to a fluttering motion.

As hereinabove discussed, a change in cutting length is accompanied by a change in load acting on the band saw, which in turn brings about the relative friction, between the saw teeth and the stock and/or the fluttering motion of the band saw, thereby adversely affecting the life time of the band saw and also the cutting efficiency. Moreover, this conventional method requires the feed speed to be adjusted with change in cutting length and, accordingly, the automatic adjustment of the feed speed of the band saw can hardly be achieved unless a complicated and expensive control system is employed.

In order to obviate the above discussed problem, it is necessary to keep the cutting length of the band saw relative to the stock to be cut, no matter how great the width of the stock to be cut, within such a range that the band saw may not be adversely affected in the manner as hereinbefore described. In an attempt to accomplish this objective, a band saw machine wherein the band saw undergoes a rocking motion during the cuting of the stock to effect an arcuate cutting has been devised. According to the prior art band saw machine so devised, a frame structure supporting the band saw is supported from above by means of a pair of rocking links inclined in the opposite directions with respect to each other so that the frame structure can be rocked by a cranking mechanism including crank arms in such a way that the opposite ends of the frame structure can be alternately shifted upwards and downwards.

With the prior art band saw machine of the type wherein the band saw undergoes the rocking motion during the cutting operation, since the stock is cut arcuately, the cutting length of the band saw relative to the stock can be kept within the predetermined range regardless of the width of the stock being cut. However, it has been found that not only can the path of movement of the trailing end of the cutting zone of the band saw be rendered arcuate completely, but also the cutting can be performed at equal speed at all times.

In other words, since the stock can not be cut accurately so as to leave an arcuate cut line, the cutting length of the band saw tends to vary more or less. Moreover, even if the band saw is driven so as to travel at equal speed, the feed speed of the band saw relative to the stock varies with the angle of inclination of the band saw and, accordingly, both the cutting length of the band saw relative to the stock and the feed speed of the band saw cannot be kept at a constant value throughout the cutting operation. Furthermore, the band saw as a whole tends to flutter, the necessity has arisen that the cutting reach of the band saw must have a greater length than the maximum width of the stock, and therefore, the machine tends to become bulky having its increased width.

SUMMARY OF THE INVENTION

The present invention has been developed with a view to substantially eliminating the above described disadvantages inherent in the prior art band saw machine and has for its essential object to provide an improved band saw machine effective to avoid any possible excessive load acting on the cutting zone of the band saw and, consequently, effective to avoid any possible flattering motion of the band saw and also any possible breakage of the band saw, with no need to adjust the travelling speed of the bahd saw according to the position of the stock being cut and also to increase the size of the machine.

In order to accomplish this object, the present invention is directed to a band saw machine of the type comprising a generally elongated frame structure including a pair of spaced apart guide wheels and an endless band saw trained between the guide wheels and capable of travelling in one direction over the guide wheels, said endless band saw having a cutting reach and a return reach between the guide wheels, said frame structure being supported for movement relative to the stock for permitting the cutting reach of the endless band saw to cut the stock.

According to one feature of the present invention, the band saw machine of the type referred to above is provided with a rocking means including a pair of spaced apart, speed-controllable reciprocating drives spaced in a direction parallel to the direction of travel of the endless band saw and operatively coupled with the frame structure so that the endless band saw can be rocked through a predetermined angle in the opposite direction around the stock to be cut.

With the provision of the rocking means, by operating the reciprocating drives alternately so as to project and retract so that the opposite ends of the frame structure can be upwardly and downwardly shifted at increasing and decreasing speeds, respectively, relative to the stock, the endless band saw can undergo a rocking motion together with the frame structure around the stock with the tangential point between the cutting reach of the endless band saw and the imaginary arcuate curve reciprocately moving circumferentially at equal speed.

Where the endless band saw undergoing the rocking motion and the stock are moved a predetermined distance in a direction close to and relative to each other, for example, at the end of the angular movement of the endless band saw in one of the opposite directions during the rocking motion, the endless band saw can cut the stock in predetermined incremental depth generally arcuately, At this time, since the endless band saw constantly extends tangentially to the imaginary arcuate curve, the cutting length and the feed speed can be advantageously kept at a constant value.

In the band saw machine according to the present invention, since the endless band saw can undergo the rocking motion in the manner a hereinbefore described, that is, the endless band saw can undergo the tangentially displaced rocking motion as defined later, not only is the endless band saw rendered free from any load which would otherwise constitute a cause of the reduced life time of the endless band saw, but also the efficent cutting performance can be appreciated.

Moreover, since the tangentially displaced rocking motion of the endless band saw takes place without the center position of the frame structure being substantially displaced, not only can the length of the cutting zone of the cutting reach of the endless band saw be shortened a compared with that in the conventional band saw machine, but also the band saw machine can have a reduced machine width and be consequently compact in size.

According to another feature of the present invention, the band saw machine of the construction described above is provided with a pair of detectors alternately activated by the opposite ends, or actuating members connected to the opposite ends, of the frame structure as a result of the rocking motion of such frame structure, respectively. These detectors are utilized to interrupt the rocking motion of the frame structure and, hence, the endless band saw, when one of the detectors is activated by the corresponding end or actuating member of the frame structure. These detectors are operatively associated with means for adjusting the position of both of the detectors in a direction generally parallel to the direction of movement of the frame structure relative to the stock to be cut.

The detectors are alternately activated by the opposite ends or the actuating members of the frame structure which are, during the rocking motion of the endless band saw, alternately upwardly and downwardly shifted. Accordingly, when one of the detectors is activated by the associated end or actuating member of the frame structure then upwardly shifted during the rocking motion in one direction, the rocking motion in such one direction can be interrupted and, simultaneously therewith, the rocking motion in the opposite direction is initiated so that the other of the detectors can be activated by the associated end or actuating member of the frame structure then upwardly shifted as a result of the rocking motion in said opposite direction. Therefore, when the position of the detectors relative to the frame structure is adjusted in a direction close towards or away from the frame structure, the amplitude of the rocking motion can be correspondingly adjusted and, consequently, the cutting length of the cutting reach of the band saw used to cut the stock arcuately can be adjusted.

In view of the foregoing, where the position of the detectors is adjusted in consideration of the width or size of the stock to be cut prior to the band saw machine being operated, the cutting of the stock can be efficiently performed with the cutting length of the cutting reach of the endless band sa adjusted to a proper value during the arcuate cutting of the stock.

If the position of the detectors is automatically adjusted in dependence on the cutting width at each cutting level of the stock, even though the stock to be cut has a cross sectional representation varying from one point to the opposite point in a direction perpendicular to the direction of feed of the band saw, such as, for example, a round bar, the cutting length of the cutting reach of the band saw used to perform the arcuate cutting to the stock can be correspondingly automatically adjusted to a proper value appropriate to the cutting width at a particular cutting level of the stock, thereby increasing the cutting efficiency.

In the practice of the present invention, if the stock to be cut is fixedly supported with its longitudinal axis or center positioned generally in alignment with the center line on which the point about which the frame structure undergoes the rocking motion lies, the efficient cutting of the stock can be carried out.

Therefore, according to a further feature of the present invention, the band saw machine of the type referred to above is also provided with a positioning means for fixedly supporting the stock, which comprises a vise including a fixed vise jaw and a movable vise jaw mounted on the machine bench for movement in a direction close to and away from the fixed vise jaw, and a vise drive means for causing the movable vise jaw to move in the direction close to and away from the fixed vise jaw. In this construction, the frame structure is mounted on a carriage supported by the machine bench and adapted to be moved by a carriage drive means in a direction parallel to the direction of movement of the movable vise jaw, and includes a movable member operatively coupled with the vise drive means for movement in a direction parallel to the direction of movement of the carriage at a speed twice higher than the speed of movement of the carriage. An operating member is connected to, or formed integrally with, the movable vise jaw and positioned adjacent thereto, the position of which operating member is adapted to be detected by a position detector wherefore, when the center of the cutting zone of the endless band saw which is actually used to cut the stock deviates from the alignment with a point intermediate between the fixed and movable vise jaws, the position detector can assume a state different from that assumed thereby when the center of the cutting zone aligns with the point intermediate between the fixed and movable vise jaw.

In the band saw machine provided with the positioning means of the construction described above, the stock, regardless of its size or width, can be firmly held between the fixed and movable vise jaws having been clamped against the fixed vise jaw by the movable vise jaw. Therefore, the operating member movable together with the movable vise jaw moves as the movable vise jaw is moved close to the fixed vise jaw, with the relationship in position between the fixed and movable vise jaws consequently displaced to such an extent as to result in the operation of the position detector. When the carriage is subsequently moved in a direction towards the position where it aligns with the point intermediate between the fixed and movable vise jaws, and when the center line of the band saw subsequently aligns with the point intermediate between the fixed and movable vise jaws, the position detector assumes a state different from that previously assumed and, therefore, the transverse movement of the carriage can be interrupted to complete the centering of the stock, then held by the vise, relative to the band saw.

With this arrangement, the stock to be cut can readily and easily be mounted on the vise merely by placing the stock so as to contact the fixed vise jaw and then causing the movable vise jaw to clamp it together with the fixed vise jaw. By so doing, the stock to be cut can readily be centered with the center line of the endless band saw, and neither the adjustment of the position of the stock on the vise, not the adjustment in position of the fixed and movable vise jaws together with the stock are necessary. Moreover, since when the transverse carriage is moved in such a direction that the center line of the band saw can shift in a direction close towards the longitudinal axis of the stock, the centering between the band saw and the stock can be achieved, the band saw machine according to the present invention is particularly suited for cutting the stock having a substantial weight.

When the carriage is moved transversely of the stock for the purpose of centering in the manner as hereinabove described, change in state of the position detector can provide an indication of the condition of the centering regardless of the width of the stock Therefore, the centering procedure can readily and easily be performed with no fault.

In the practice of the present invention, the reciprocating drives alternately operable to effect the rocking motion of the endless band saw may comprise a fluid-operated cylinder having a piston rod. As a matter of practice, these fluid-operated cylinders must be alternately operated in order to effect the rocking motion of the endless band saw in such a way that, when one of the opposite ends of the endless band saw is upwardly shifted with the piston rod of one of the cylinders projected, the other of the opposite ends of the endless band saw is downwardly shifted with the piston rod of the other of the cylinders retracted. In other words, one of the fluid-operated cylinders has to be operated in a sense opposite to the other of the fluid-operated cylinders. For this purpose, the band saw machine embodying the present invention is provided with a single flow control valve assembly in a fluid circuit connecting between a source of fluid medium and the fluid-operated cylinders.

The single flow control valve assembly employed in the present invention comprises a valve casing having a fluid intake port means, communicated with the fluid source, and first ans second discharge port means communicated respectively with the fluid-operated cylinders, and a rotary valving means housed within the valve casing for rotation through a limited angle between first and second positions spaced angularly from each other. The rotary valving means has first and second shutter members for closing the first and second discharge port means when the rotary valving means is rotated from the second position to the first position and from the first position to the second position, respectively. Specifically, when the rotarty valving means being rotated approaches the first or second position, the opening of the first or second discharge port means is gradually reduced so that, in carrying out the rocking motion of the endless band saw, the piston rod of one of the fluid-operated cylinder can project quickly while that of the other of the fluid-operated cylnders can retract slowly.

Therefore, during the operation of the flow control valve assembly, the flow of the fluid medium under pressure from one of the first and second discharge port means to one of the fluid-operated cylinders with which such one of the first and second discharge port means is communicated increases or decreases while the flow of the fluid medium under pressure from the other of the first and second discharge port means to the other of the flud-oeprated cylinders with which such other of the first and second discharge port means is communicated decreases or increases, respectively.

Although the present invention does not exclude the use of separate flow control valves operatively coupled with each other so as to operate alternately, the use of the single flow control valve assembly is advantageous, as compared with the use of the separate flow control valves, in that the fluid circuit can be constructed with the minimized number of component parts and also in that the requisite control of the supply of the fluid under pressure to the fluid-operated cylinders can be simplified.

According to the present invention, there is also provided a method for cutting a stock to be cut by the use of a band saw machine comprising an endless band saw travelling in one direction and having cutting and return reaches between the guide wheels over which the endless band saw is trained, which machine cuts the stock by causing the endless band saw to undergo a rocking motion generally around the stock while the endless band saw is intermittently fed through a plurality of cutting levels in a direction towards and across the stock. This cutting method is characterized in that, at each of the cutting levels, the cutting of the stock is effected only by feeding the endless band saw downwardly in a vertical direction so as to reach the next succeeding cutting level while the rocking motion of the endless band saw is either interrupted or continued at an appropriate timing prior to a trailing end of that cutting zone of the cutting reach of the endless band saw, which is actually used to cut the stock, with respect to the direction of travel of the endless band saw, arriving at one side of the stock being cut, and in that, when and after the cutting reach of the endless band saw has reached the next succeeding cutting level, an arcuate cutting is effected to the stock in the opposite direction.

According to the above described method of the present invention, no condition occur wherein, at the end of the stroke of the arcuate cutting performed by the band saw ar each arcuate cutting level, the band saw would not work on the stock. As a result thereof, throughout the entire cutting operation from the start to the finish with respect to a given stock, the endless band saw can be kept working in cutting operation completely or substantially completely, thereby ensuring the efficient and economical cutting operation.

It is to be noted that, because of the vertical down feed cutting operation performed at each end of the stroke of the arcuate cutting, the length of the cutting zone of the endless band saw becomes very great. Although this appears to be contradictory to the performance of the arcuate cutting, the intended objective can be attained by controlling the speed of the vertical down feed cutting to such a value that any excessive load will not act on the cutting reach of the endless band saw.

Furthermore, according to the present invention, there is also provided a method for cutting a stock having a cross-section of circular shape or the like and having upper, intermediate and lower areas in its cross-sectional representation with respect to the direction of feed of a cutting reach of the endless band saw. This cutting methdd is characterized in that the upper area of the stock is cut by feeding the endless band saw downwardly while at least the cutting reach of the endless band saw is held at a predetermined angle relative to the stock, in that the intermediate area of the stock is cut by feeding the endless band saw downwardly intermittently through a plurality of cutting levels while the endless band saw is permitted to undergo a rocking motion generally around the stock in such a manner that, at each of said cutting levels, the rocking motion is either interrupted or continued at an appropriate timing prior to a trailing end of that cutting zone of the cutting reach of the endless band saw, which is actually used to cut the stock, with respect to the direction of travel of the endless band saw, arriving at one side of the stock being cut thereby to permit the cutting reach of the endless band saw to reach the next succeeding cutting level, and an arcuate cutting is effected to the stock in the opposite directin after the cutting reach as reached the next succeeding cutting level, and in that the lower area of the stock is cut by feeding the cutting reach of the endless band saw downwardly while the cutting reach of the endless band saw is held at said predetermined angle.

According to the second mentioned method of the present invention, even with the stock to be cut having such a cross-sectional representation that, during the cutting operation from the start to the finish, the length of the cutting zone of the cutting reach of the endless band saw varies from a minimum value to a maximum value depending on the cutting level at which the actual cutting is performed, the direction of arcuate cutting motion of the endless band saw need not be frequently changed because the downward feed cutting technique is used to the cutting of the upper and lower are of the stock.

Moreover, any possible reduction in cutting efficiency which would be likely to occur at the start and finish of the cutting can advantageously avoided, and, therefore, in combination of the cumulative effects of the present invention as hereinbefore described, the cutting of the stock of circular crosssection can advantageously efficiently be performed. Even in this case, by controlling the speed of the vertical down feed cutting to such a value that any excessive load will not act on the cutting reach of the endless band saw, the intended objective of the present invention can readily be achieved with no doubt.

BRIEF DESCRIPTION OF THE DRAWINGS

These and other objects and features of the present invention will readily be understood upon the reading of the following description take in conjunction with preferred embodiments thereof with reference to the accompanying drawings, in which:

FIG. 4 is a top sectional view of a self-centering mechanism employed in the band saw machine, showing the relationship between a band saw support and a transverse brace both used in the machine;

FIG. 5 is a side sectional view of the self-centering mechanism shown in FIG. 4;

FIG. 6 is a front elevational view, on an enlarged scale, of the band saw machine, showing the positioning mechanism for a stock to be cut;

FIG. 7 is a schematic longitudinal sectional view of the positioning mechanism shown in FIG. 6;

FIG. 8 is a transverse sectional view of a switch unit used in the positioning mechanism;

FIG. 9 is a schematic diagram showing a fluid circuit for a rocking mechanism used in the machine;

FIG. 10 is a schematic front elevational view showing the path of movement of the band saw support together with position detector switches;

FIGS. 12 to 15 are schematic diagrams employed for the explanation of the cutting methods according to the present invention;

FIG. 16 is a timing chart showing the relationship in operation among the transverse brace, the band saw support and the endless band saw;

FIGS. 17 to 19 are flow charts showing the sequence of automatic control performed by the machine;

DETAILED DESCRIPTION OF THE EMBODIMENTS

Figure 1:
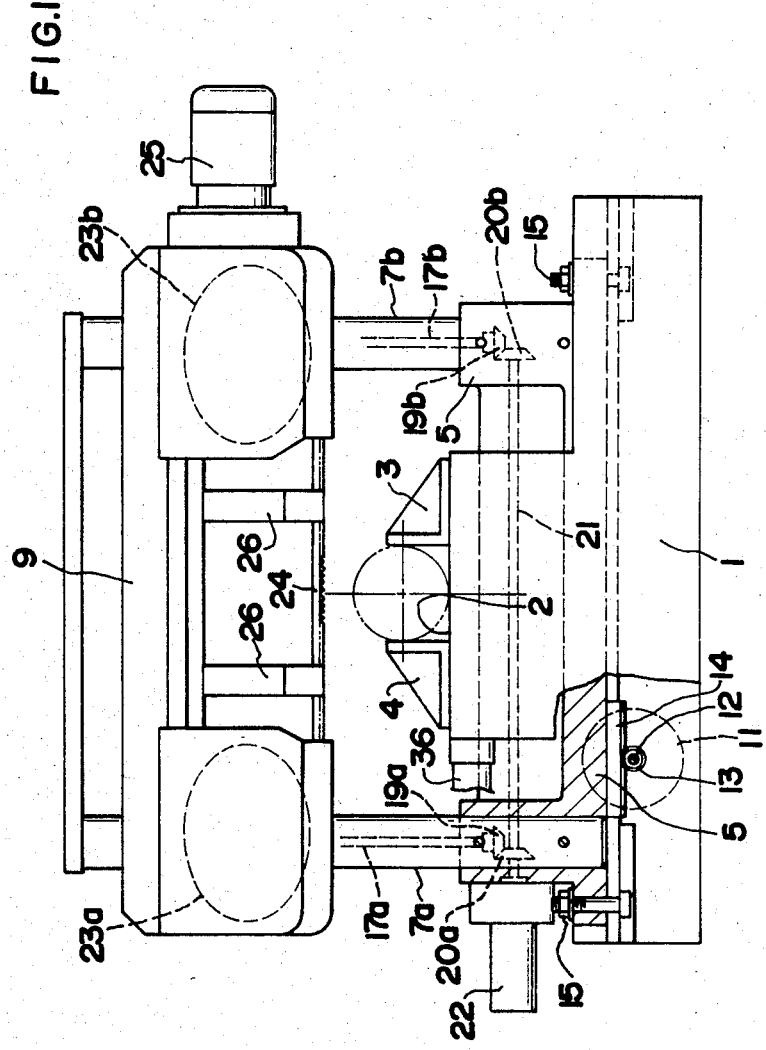
FIG. 1 is a front elevational view, with a portion cut away, of a band saw machine embodying the present invention.

Before the description of the embodiments of the present invention proceeds, it is to be noted that like parts are designated by like reference numerals throughout the accompanying drawings.

Figure 2:
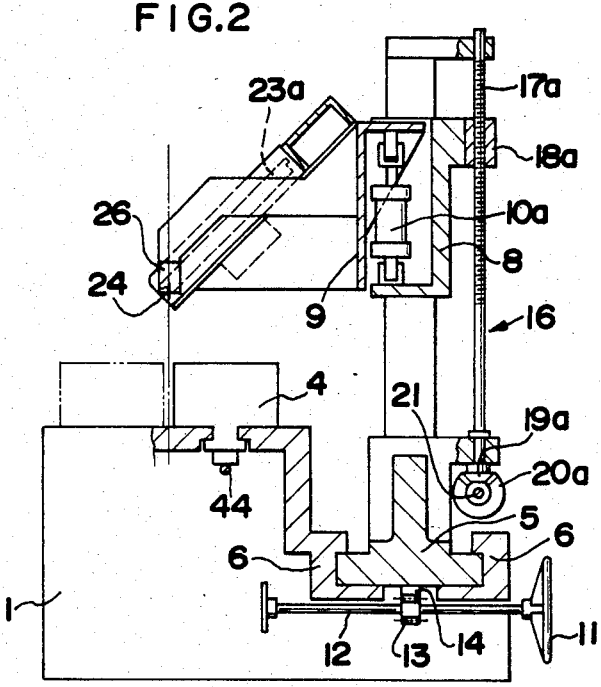
FIG. 2 is a longitudinal sectional view of the band saw machine shown in FIG. 1.
Figure 3:
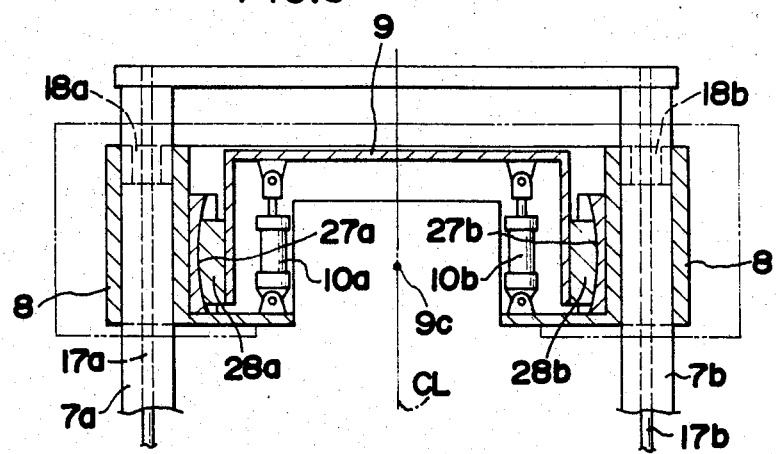
FIG. 3 is a front sectional view of an essential portion of the band saw machine.

Referring first to FIGS. 1 to 3, a band saw machine embodying the present invention comprises a machine bench 1 having a vise base 2 on which a vise consisting of a fixed vise jaw 3 and a movable vise jaw 4 are mounted in face-to-face relation with each other. A transversely movable carriage 5 of generally elongated configuration having a pair of parallel upright pillars 7a and 7b extending upwardly from the opposite ends thereof is mounted on the bench 1 and guided by slide guides 6 for movement in a direction parallel to the longitudinal sense of the machine bench 1. Carried by the upright pillars 7a and 7b for movement in a direction upwardly and downwardly along such pillars 7a and 7b and bridging therebetween is a transverse brace 8 on which a band saw support 9 is supported by means of a pair of rocking drives 10a and 10b positioned inwardly adjacent the upright pillars 7a and 7b. The rocking drives 10a and 10b are independently controlled for effecting a rocking motion of the band saw support 9 in a manner as will be described in details later.

The carriage 5 is provided with a rack gear 14 extending in a direction parallel to the longitudinal sense thereof and constantly meshed with a pinion gear 13 rigidly mounted on a shaft 12. One of the opposite ends of the shaft 12 remote from the pinion gear 13 has mounted thereon a manipulatable wheel 11, wherefore when the wheel 11 is manually rotated, the carriage 5 can be moved in a direction parallel to the longitudinal sense of the bench 1 within a predetermined distance. This carriage 5 is provided at its opposite ends with respective sets of bolts and nuts, generally identified by 15, for locking purpose. The vertical movement of the transverse brace 8 carrying the band saw support 9 can be effected by means of an elevating mechanism 16 comprising a pair of parallel threaded rods 17a and 17b extending in parallel relation to the respective upright pillars 7a and 7b and having their opposite ends rotatably, but axially non-movably supported by the respective upright pillars 7a and 7b, internally threaded blocks 18a and 18b threadingly mounted on the respective threaded rods 17a and 17b and rigidly secured to, or otherwise integrally formed with, the transverse brace 8, a drive shaft 21 having a pair of spaced bevel gears 20a and 20b rigidly mounted thereon for rotatiion together therewith, a pair of mating bevel gears 19a and 19b rigidly secured to lower ends of the respective threaded rods 17a and 17b and constantly meshed with the respective bevel gears 20a and 20b on the drive shaft 21, and a stepper motor 22 for driving the drive shaft 21. Thus, it will readily be seen that, when the stepper motor 22 is operated to rotate the drive shaft 21, the rotation of the drive shaft 21 can be transmitted to the threaded rods 17a and 17b through the meshed bevel gears 20a and 20b and 19a and 19b with the threaded rods 17a and 17b consequently threadingly driving the internally threaded blocks 18a and 18b and, hence, the transverse brace 8 fast therewith, in a direction lengthwisely of the threaded rods 17a and 17b.

The band saw support 9 has mounted thereon driven and drive wheels 23a and 23b spaced apart from each other and also has a flexible endless band saw 24 trained about and between the wheels 23a and 23b. The drive wheel 23b is drivingly coupled with a drive motor 25 in any known manner so that, during the operation of the drive motor 25, the endless band saw can be driven in one direction travelling over the drive and driven wheels 23b and 23a. As best shown in FIG. 3, the drive and driven wheels 23a and 23b are so supported as to rotate in a plane downwardly inclined relative to the upright pillars 7a and 7b and, therefore, the band saw support 9 is provided with a pair of spaced saw guides 26 operable to twist the cutting reach of the endless band saw 24, i.e., that portion of the endless band saw 24 which enters a cutting zone immediately above the vise base 2 during the travel thereof, so that the saw teeth of the endless band saw 24 can be oriented downwards. As best shown in FIG. 3, the band saw support 9 has a pair of spaced engagements 28a and 28b positioned adjacent the opposite ends of the transverse brace 8 and facing in a direction away from each other. These engagements 28a and 28b are cooperable with inwardly curved surfaces 27a and 27b formed in the transverse brace 8 adjacent the upright pillars 7a and 7b, respectively.

The details of each of the engagements 28a and 28b are best shown in FIGS. 4 and 5, reference to which will now be made. It is to be noted that, since the engagements 28a and 28b are of identical construction with each other, only one of them, for example, the engagement 28a positioned adjacent the upright pillar 7a and cooperable with the inwardly curved surface 27a will be discussed for the sake of brevity. The engagement 28a comprises a rigid support block 31 rigidly secured to, or otherwise integrally formed with, the band saw support 9 and having a portion thereof slidingly received in a space defined by the associated inwardly curved surface 27a and a pair of side plates 30 rigidly secured to a rigid block 29, the rigid block 29 being secured to the transverse brace 8 and having the inwardly curved surface 27a defined therein. The rigid support block 31 carries a pair of spaced roller units generally identified by 32 and positioned one above the other along the path of rocking movement of the band saw support 9. Each of these roller units 32 comprises a guide roller 35 rotatably carried by a carrier piece 34 slidingly received within a respective pocket defined in the rigid support block 31, and a biasing spring 32 housed within such pocket in the rigid support block 31 and urging the carrier piece 34 outwardly with the guide roller 35 consequently hend in contact with the associated inwardly curved surface 27a.

The inwardly curved surfaces 27a and 27b are so designed and so shaped as to occupy respective portions of the simple circle having its radius greater than half the distance between the inwardly curved surfaces 27a and 27b, with the respective centers of curvature thereof lying on the imaginary common horizontal line. The band saw support 9 is, by the self-centering action exhibited by the biasing springs 33 in the roller units 32, so positioned as to have its center 9c lying on the verticalcenter line CL passing intermediate between the inwardly curved surfaces 27a and 27b.

Referring to FIGS. 6 to 8, the movable vise jaw 4 is adapted to be driven by a cylinder unit 36 in a direction close to and away from the fixed vise jaw 3. Mounted on the bench 1 for movement in a direction parallel to the direction of movement of the movable vise jaw 4 is a movable member 37 carrying a switch unit 39 thereon and provided with a rack gear 40 extending in a direction parallel to the direction of movement thereof. During the movement of the movable member 37 which is effected by the rotation of a pinion gear 41 meshed with the rack gear 40, the movable member 37 is guided by and along a pair of guide rails 38. The pinion gear 41 meshed with the rack gear 40 as hereinabove described is rigidly mounted on a shaft 42 for rotation together therewith, which shaft 42 is in turn drivingly coupled with the shaft 12 by means of a transmission system 43 which may comprise an endless chain and which is s designed as to enable the movable member 37 to be moved in the same direction as the direction of movement of the carriage 5, but at a speed twice higher than the speed of movement of the carriage 5. The switch unit 39 mounted on the movable member 37 includes a pair of detector switches 45a and 45b for detecting the tip 44a of an operating rod 44 secured to the movable vise jaw 4 so as to extend in a direction parallel to the direction of movement thereof. Specifically, the switch unit 39 is so designed and so constructed that, when the fixed and movable vise jaws 3 and 4 are brought in position abutting against each other with their respective clamping surfaces held substantially in alignment with the vertical center line CL, only one of the switches, for example, the switch 45a, can be turned on by the tip 44a of the operating rod 44 as shown in FIG. 8.

As shown in FIG. 9, the rocking drives 10a and 10b comprise respective double-acting hydraulic cylinders 46a and 46b each pivotally mounted on the transverse brace 8 and having a piston rod 46c or 46d coupled pivotally to the band saw support 9. These double-acting hydraulic cylinders 46a and 46b are alternately operated such that, when one of the piston rods 46c and 46d is projected, the other of the piston rods 46c and 46d is retracted. For this purpose, the hydraulic cylinders 46a and 46b are fluid-coupled with a fluid supply pump 49 through an electromagnetic switching valve 47 for bringing the hydraulic cylinders 46a and 46b into operation alternately, and then through adjustable flow control valves 48a and 48b.

Referring now to FIG. 10, reference numerals 50a and 50b represent detector switches adapted to be alternately actuated by the left-hand and right-hand ends of the band saw support 9, respectively. These switches 50a and 50b are supported by lift members 54a and 54b movable vertically at the same speed by the rotation of vertically extending threaded shafts 53a and 53b, respectively, which threaded shafts 53a and 53b are in turn drivingly coupled with a stepper motor 51 by means of respective endless transmission systems 52a and 52b which may comprise either endless timing belts or endless timing chains.

In the band saw machine of the construction so far described, it will readily be seen that, when the electromagnetic switching valve 47 is alternately switched in position during the continued operation of the liquid supply pump 49 so that the hydraulic cylinders 46a and 46b can be alternately operated to project and retract the respective piston rods 46c and 46d, the band saw support 9 undergoes the rocking motion in a manner similar to a seesaw. If the speed of projection of one of the piston rods 46c and 46d is equal to the speed of retraction of the other of the piston rods 46c and 46d, the rocking motion of the band saw support 9 takes place about one and the same point. However, if the flow of hydraulic media to be supplied respectively to the hydraulic cylinders 46a and 46b is so adjusted automatically by the adjustment of the flow control valves 48a and 48b that the speed of projection of one of the piston rods 46c and 46d can be higher than the speed of retraction of the other of the piston rods 46c and 46d, the band saw support 9 can undergo such a rocking motion that, while the imaginary line 9L lying in the band saw support 9 and extending in parallel relation to either the cutting reach or the return reach of the band saw 24 maintains a tangential relation to the imaginary arcuate curve CS having its center of curvature lying on the vertical center line CL passing through the center of the band saw support 9 and intermediate of the distance between the inwardly curved surfaces 27a and 27b, the tangential point CP at which the imaginary line 9L extends in touch with the imaginary arcuate curve CS reciprocately moves along the imaginary arcuate curve CS as shown in FIG. 10. The direction in which the band saw support 9 is rocked in the manner as hereinabove described can be changed by switching over the position of the electromagnetic switching valve 47.

It is to be noted that the opposite ends of the stroke through which the tangential point CP moves reciprocately along the imaginary arcuate curve CS during the rocking motion of the band saw support 9 correspond to the angles of inclination of the tangential lines passing through the tangential points CP at the opposite ends of the stroke, respectively, that is, the angles of inclination of the band saw support 9 rocked in the opposite directions, respectively. Accordingly, the timing at which the band saw support 9 has established a predetermined angle of inclination during its rocking motion in any one of the opposite directions can be detected by a corresponding one of the detector switches 50a and 50b. By detecting the timing referred to above, it is possible to detect that the tangential point CP has reached one of the opposite ends of the stroke which delimits the predetermined angle of inclination of the band saw support 9. In other words, if the detector switches 50a and 50b are lowered to a lower position, the stroke through which the tangential point CP moves reciprocately is shortened and, consequently, the amplitude of the rocking motion of the band saw support 9 (more specifically, the endless band saw 24) decreases. On the other hand, if the detector switches 50a and 50b are lifted to a higher position, the stroke of the reciprocate movement of the tangential point CP is increased and, consequently, the amplitude of the rocking motion of the band saw support 9 increases. Thus, if the detector switches 50a and 50b are lowered to the lowermost position shown by the phantom line in FIG. 10, the detector switches 50a and 50b are both switched on by the opposite ends of the band saw support 9 then assuming a horizontal position. When both of the detector switches 50a and 50b are turned on in the manner as hereinabove described, it is possible to fix the band saw support 9 at the horizontal position by causing the electromagnetic switching valve 47 to return to a neutral position as shown. The vertical movement of the detector switches 50a and 50b can be automatically performed by operating the stepper motor 51 to rotate the threaded shafts 53a and 53b.

The band saw support 9 is self-centered by the action of the roller units 32 including the rollers 35 resiliently contacting the inwardly curved surfaces 27a and 27b as hereinbefore described and, accordingly, the band saw support 9, during the rocking motion effected in the manner as hereinbefore described, has its center 9c displacing on and along the vertical center line CL. In other words, when the band saw support 9 is rocked in the opposite directions with its center 9c displacing on and along the vertical center line CL (which center 9c lies on the imaginary line 9L) while the tangential point CP at which the imaginary line 9L extends in touch with the imaginary arcuate curve CS is permitted to move along the imaginary arcuate curve CS, the opposite ends of the imaginary line 9L, that is, the opposite ends of the band saw support 9 swing depicting such traces of movement as shown by 9e in FIG. 10. While it is desirable to construct and shape the inwardly curved surfaces 27a and 27b required for the band saw support 9 to undergo the rocking motion with its opposite ends depicting such traces 9e as shown in FIG. 10, it is in practice difficult to do so and, accordingly, in the practice of the present invention, while the inwardly curved surfaces 27a and 27b are so shaped as to occupy respective portions of the shape of a simple circle as hereinbefore described, the roller units 32 including the guide rollers 35 collapsible inwardly of the respective pockets against the associated biasing springs 33 are so designed and so constructed as to permit the opposite ends of the band saw support 7 to depict the traces 9e shown in FIG. 10 during the rocking motion of the band saw support 9.

Since the endless band saw 24 is carried by the band saw support 9, the rocking motion of the band saw support 9 is accompanied by a corresponding rocking motion of the endless band saw 24 a shown by the imaginary line 9L in FIG. 9, it being, however, to be noted that, if the endless band saw 24 is so positioned as to extend below the imaginary line 9L, the imaginary arcuate curve CS' to which the endless band saw 24 is tangential will have a smaller radius of curvature than the radius of curvature of the imaginary arcuate curve CS by a quantity corresponding to the displacement between the imaginary line 9L and the actual position of the endless band saw 24, and, therefore, the amplitude of the rocking motion of the endless band saw 24 will be correspondingly smaller than that represented by the imaginary line 9L. The rocking motion of the endless band saw 24 (or the band saw support 9) will be hereinafter referred to as a "tangentially displaced rocking motion".

Hereinafter, a method for setting stock or work to be cut on the band saw machine of the construction as hereinbefore described will be described. The placement of the stock W on the band saw machine can be accomplished by, as shown in FIG. 6, mounting the stock W on the vise base 2 with a portion thereof contacting the fixed vise jaw 3, and then operating the cylinder unit 36 to cause the movable vise jaw 4 to move close towards the fixed vise jaw 3 so as to clamp the stock W between the fixed and movable vise jaws 3 and 4. After the stock W is placed on the vise base 2 in the manner as hereinabove described, the manipulatable wheel 11 has to be rotated to move the carriage 5 in such a direction required to bring the longitudinal axis Wo of the stock W into alignment with the vertical center line CL of the transverse brace 8. As hereinbefore described, the rotation of the manipulatable wheel 11 is transmitted through the pinion gear 13, rigid thereon, to the rack gear 14 fast with the carriage 5 and, therefore, the carriage 5 can move in response to the rotation of the manipulatable wheel 11. Simultaneously therewith, the rotation of the manipulatable wheel 11 is transmitted through the transmission system 43 to the pinion gear 41 which is in turn transmitted to the movable member 37 through the rack gear 40 fast with said movable member 37 and, accordingly, the switch unit 39 mounted on the movable member 37 is moved in the same direction as the direction of movement of the carriage 5 at a speed twice higher than the speed of movement of the carriage 5.

The distance over which the carriage 5 is moved from the position wherein the clamping surface of the fixed vise jaw 3 is aligned with the vertical center line CL of the transverse brace 8 to the position wherein the longitudinal axis Wo of the stock W to be cut is brought into alingment with the vertical center line CL is half the distance over which the movable vise jaw 4 is moved from the initial position in which the clamping surface of the movable vise jaw 4 is in contact with the clamping surface of the fixed vise jaw 3. Accordingly, when the switch unit 39 being moved at a speed twice higher than the speed of movement of the carriage 5 in the same direction as the direction of movement of the carriage 5 reach a position wherein the vertical center line CL is in alignment with the longitudinal axis Wo of the stock W to be cut, only the detector switch 45a in the switch unit 39 is turned on by the tip 44a of the operating rod 44 fast with and movable together with the movable vise jaw 4. Accordingly, if arrangement is made to provide a visual and/or audible indication of the on and off states of any one of the switches 45a and 45b in the switch unit 39, the operator of the band saw machine can ascertain that, if both of the switches 45a and 45b are switched on, the vertical center line CL is displaced on one side of the longitudinal axis Wo of the stock W adjacent the movable vise jaw 4 and that, if both of the switches 45a and 45b are switched off, the vertical center line CL is displaced on one side of the longitudinal axis Wo of the stock W adjacent the fixed vise jaw 3. Thus, the combined use of the switches 45a and 45b adapted to be operated by the operating rod 44 is effective to provide the visual and/or audible indication of the horizontal position of the stock W relative to the transverse brace 8. Therefore, after the mounting of the stock W on the vise base 2, the operator of the band saw machine has to turn the manipulatable wheel 11 until only the switch 45a is turned on at which time the longitudinal axis Wo of the stock w clamped between the fixed and movable vise jaws 3 and 4 is brought into alingment with vertical center line CL.

It is to be noted that the position of the vertical center line CL of the transverse brace 8 relative to the bench 1 can be indicated by a pointer needle secured to the manipulatable wheel 11 for angular movement together with the manipulatable wheel 11, and one of a plurality of calibrations provided on the bench 1 adjacent the path of movement of the pointer needle. In such case, the reading on the calibrations aligned with the pointer needle may represent the width of the stock W, that is, the space between the fixed and movable vise jaws 3 and 4. It is also to be noted that, although the wheel 11 has been described as manually rotatable, the shaft 12 may be coupled to an electric motor and, in such case, an output signal or signals from the detector switches 45a and 45b may also be used for controlling the direction of rotation of the electric motor as well as the start and stop of the electric motor.

The principle of cutting the stock with the use of the band saw machine of the construction as hereinbefore described will first be described.

After the stock W to be cut has been placed on the vise base 2 and clamped between the fixed and movable vise jaws 3 and 4 in the manner as hereinbefore described, the motor 25 has to be activated to drive the endless band saw 24 in a predetermined direction at a predetermined speed, travelling over the wheels 23a and 23b. Subsequently, the stepper motor 22 is operated to drive the threaded rods 17a and 17b to lower the transverse brace 8 along the vertical pillars 7a and 7b. It is to be noted that the lowering of the transverse brace 8 along the upright pillars 7a and 7b over a distance X from the highest permissible position, spaced a height H from the top surface of the vise base 2, to a position E spaced a distance d upwardly from the top of the stock W may be effected quickly by driving the threaded rods 17a and 17b at a relatively high speed, if the cycle time is desired to be shortened. When the transverse brace 8 is lowered with the cutting reach of the endless band saw 24 arriving at the position E, the speed of rotation of the stepper motor 22 has to be reduced to permit the transverse brace 8 to be downwardly moved at a reduced speed along the upright pillars 7a and 7b, the low speed lowering of the endless band saw 24 being continued until the cutting reach of the endless band saw 24 is moved, i.e., fed, over a distance Y which corresponds to the sum of the height (or thickness) h of the stock W above the top surface of the vise base 2 and the distance d referred to hereinabove.

When the cutting reach of the endless band saw 24 is brought to a position A where it contacts the top of the stock W, the tangentially displaced rocking motion of the band saw support 9 as hereinbefore discussed is effected while the transverse brace 8 is, together with the band saw support 9, intermittently lowered, until the cutting reach of the endless band saw 24 reaches the lowermost permissible position B at which time the stock W has been completely cut into pieces. More specifically, when the band saw support 9 undergoes the rocking motion while the tangential point at which the cutting reach of the endless band saw 24 extends in touch with the imaginary arcuate curve CS moves along the imaginary arcuate curve CS reciprocately at equal speed as shown in FIG. 10, the cutting reach of the endless band saw 24 being driven in one direction undergoes a similar tangentially displaced rocking motion along the imaginary arcuate curve CS' corresponding to the imaginary arcuate curve CS. However, each time th tangential point CP' at which the cutting reach of the endless band saw 24 extends in touch with the imaginary arcuate curve VS' reach one of the opposite ends e1 and e2 of the cutting stroke in the opposite directions, the rocking motion of the band saw support 9 is interrupted to permit the transverse brace 8 to be lowered while the cutting reach of the endless band saw 24 is permitted to cut the stock W in a predetermined depth s aided by the lowering of the transverse brace 8 and, hence, the band saw support 9. The detector switches 50a and 50b detect the termination of the rocking motion in one of the opposite directions at which one of the opposite ends of the band saw support 9 actuates the adjacent one of the switches 50a and 50b. The down feed of the cutting reach of the endless band saw 24 to effect the vertical cutting of the stock W in the predetermined depth s can be carried out by operating the stepper motor 22 to lower the transverse brace 8.

With the endless band saw 24 so controlled as hereinbefore described, that portion of the cutting reach of the endless band saw 24 which lies between the tangential point CP', at which it touches the imaginary arcuate curve CS', and the point P at which the cutting reach of the endless band saw 24 extends tangentially to the preceding imaginary arcuate curve CS' (the cutting surface of the stock W) at one of the opposite ends of the stroke of movement of the tangential point CP' is in practice used as a cutting region 24a. This cutting region 24a of the endless band saw 24 arcuately cuts the stock W at each arcuate portion delimited by the neighbouring imaginary arcuate curves CS', up until it passes across the point B of the stock W opposite to the point A, thereby completing the complete cutting of the stock W.

The length of the cutting region 24a of the endless band saw 24, that is, the cutting length La, is of a fixed value since the cutting reach of the endless band saw 24 moves in a tangential direction to the imaginary arcuate curve CS'. In addtion, since the tangential point CP' reciprocately moves at equal speed following the imagninary arcuate curve CS', the speed at which the cutting region 24a of the endless band saw 24 arcuately cuts the stock W, which speed is hereinafter referred to as the "arcuate cutting speed", is of a fixed value. The cutting length La can be selected to any desired value by, if the radius of curvature of any one of the neighbouring imaginary arcuate curves CS' is fixed, changing the depth s of the vertical feed cut, which is attained at any one of the opposite ends e1 and e2 of the stroke of the rocking motion of the band saw support 9 thereby to change the space between the neighbouring imaginary arcuate curves CS'. Moreover, the arcuate cutting speed can also be selected to any desired value by controlling the flow of the hydraulic media to be supplied respectively to the cylinder units 46a and 46b thereby to change the speed of inclination of the tangentially displaced rocking motion performed by the band saw support 9. Accordingly, it is desirabe to select one or both of the cutting length La and the arcuate cutting speed to a maximum permissible value depending on the material of the stock W to be cut and/or the physical strength of the endless band saw 24 used in the band saw machine.

Figure 12:
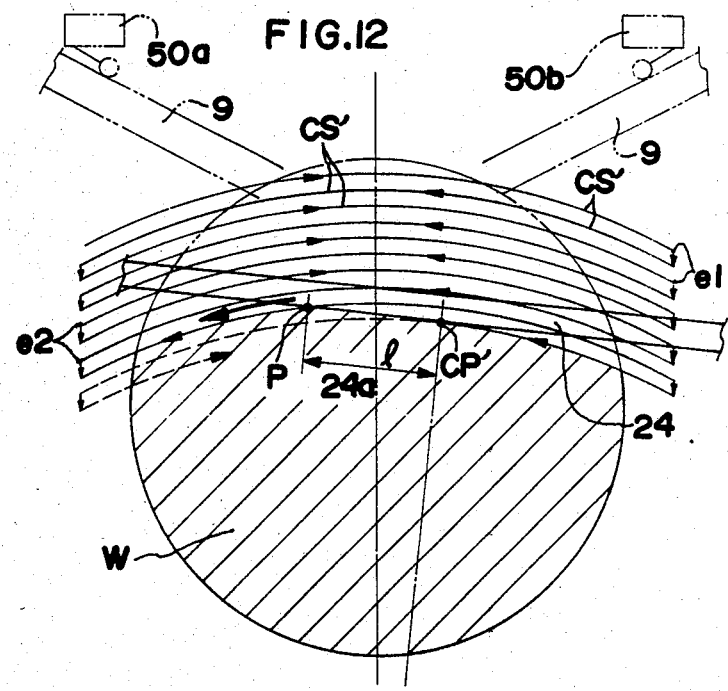

According to the cutting method shown in and described with reference to FIG. 12, the band saw machine is so designed that the amplitude of the tangentially displaced rocking motion of the band saw support 9 is of a maximum value and, also, the stroke of movement of the tangential point CP' on the imaginary arcuate curve CS' is of a maximum value. Accordingly, the endless band saw 24 undergoes the rocking motion exceeding the cutting width of the stock W and, therefore, the smaller the width of the stock W, the lower the cutting efficiency. This problem can be substantially obviated by a modified method which will now be described.

The cutting length La of the endless band saw 24 which cuts the stock W during the rocking motion of the band saw support 9 starts decreasing from the moment the point P described with reference to FIG. 12 has been shifted to one side Ws of the stock W as shown in FIG. 13 and becomes zero when the tangential point CP' bas shifted to the side Ws of the stock W as shown by the phantom line in FIG. 13. However, it may be possible to effect the vertical down feed cutting, while the rocking motion of the endless band saw 24 is interrupted, at the time the tangential point CP' has shifted to the position where the cutting length La starts decreasing, that is, the position F preceding about the cutting length La from the side Ws of the stock W.

In such case, the length L of the cutting region 24a of the endless band saw 24, which has descended to the lower imaginary arcuate curve CS' as shown in FIG. 14 will be about twice the cutting length La attained during the cutting operation utilizing the rocking motion of the endless band saw 24 and, therefore, the vertical down feed cutting of the endless band saw 24 should be effected at a controlled speed required to prevent the endless band saw 24 from being excessively loaded. However, the length of the cutting region 24a of the endless band saw 24 undergoing the rocking motion in the opposite direction along the subsequent imaginary arcuate curve CS' will be of a value La as expected.

In order to carry out the above described modified method according to the present invention, the position F referred to hereinbefore, that is, the position F at which the tangentially displaced rocking motion is to be interrupted to permit the vertical down feed cutting, has to be determined beforehand in consideration of the width of the stock W to be cut so that, when the trailing end of the cutting region 24a of the endless band saw 24 (that is, the tangential point CP' on the imaginary arcuate curve CS') is brought to the position F, either one of the detector switches 50a and 50b then lowered to a predetermined lower position can detect the corresponding end of the band saw support 9 then upwardly shifted as a result of the rocking motion thereof. By so doing, it is posbile to perform an automatic control in such a way as to interrupt the tangentially displaced rocking motion to permit the vertical down feed cutting on the basis of the result of the detection performed by the detector switches 50a and 50b, in a manner substantially similar to that described with reference to FIG. 12.

Where the stock W to be cut has a circular cross-sectional shape, the cutting length along the imaginary arcuate curve CS' (that is, the length of that portion of the imaginary arcuate curve CS' which overlaps the length of the stock W being cut) is maximum at the center of the stock W and minimum at the start and the finish of the cutting operation. Accordingly, the stroke of the tangentially displaced rocking motion performed by the endless band saw 24 along the imaginary arcuate curve CS' in each stage has to be adjusted according to the cutting length represented by the imaginary arcuate curve CS' in each stage. For this purpose, as shown in FIG. 15, the previously described position F must be set at a position on the imaginary arcuate curve CS' in each stage spaced a proper distance Fl from the side Ws of the stock W. This setting of the position F can be accomplished by the following procedure.

The setting of the position F can be accomplished by first determining the control position F on the imaginary arcuate curve CS' traversing the center of the stock W at which the cutting length is maximum, then determining an auxiliary line passing through the longitudinal axis Wo of the stock W at right angles thereto and at an angle of inclination of $\theta/2$ wherein $\theta$ represents the angle of inclination of the tangential line 241 (corresponding to one saw tooth edge of the endless band saw 24) passing through the control position F, determining on the auxiliary line the point O' spaced a distance Fl from the longitudinal axis of the stock W, and finally determining on respective sides of the point O' a pair of opposite arcuate curves Fc having their radii of curvature equal to the distance between the point O' and the control position F. Then, the intersecting point between the imaginary arcuate curve CS' in each stage and the arcuate curves Fc can be used as the control position F on the imaginary arcuate curve CS' in each stage.

An important factor in the control is not the coordinate of the control position F on the imaginary arcuate curve CS' in each stage, but the angle $\theta$ of inclination of the tangential line 241 at the control position F and the position of the detector switches 50a and 50b corresponding to the angle $\theta$ of inclination of the tangential line 241. In other words, it is necessary to determine beforehand the position of the detector switches 50a and 50b corresponding to the angle $\theta$ of inclination of the tangential line 241 at the control position F for each arcuate cutting level (the imaginary arcuate curve CS' in each stage), in consideration of the diameter of the stock W to be actually cut. Thereafter, the endless band saw 24 is allowed to undergo the tangentially displaced rocking motion at each arcuate cutting level, it being, however, that the stepper motor 51 has to be controlled to move the detector switches 50a and 50b to the predetermined position by the time the tangentially displaced rocking motion is initiated at each arcuate cutting level, so that, when the endless band saw 24 (and, hence, the band saw support 9) attains the angle $\theta$ of inclination corresponding to the imaginary arcuate curve CS' at such cutting level, any one of the detector switches 50a and 50b can detect the end of the band saw support 9 then upwardly shifted as a result of the rocking motion.

By effecting the control for changing the position of the detector switches 50a and 50b in the manner as hereinbefore described and then, based on the result of the detection performed by the detector switches 50a and 50b, automatically effecting the interruption of the tangentially displaced rocking motion and the start of the vertical down feed cutting, it is possible to automatically perform the cutting method, described with reference to FIG. 14, subject to the stock W of circular cross-sectional shape. That is, the control for changing the position of the detector switches 50a and 50b is effective for automatically changing the arcuate cutting stroke length, attained during the tangentially displaced rocking motion, to suit to the width of the stock W to be cut in each arcuate cutting level.

In the practice of the above described cutting method, where the stock W to be cut has a circular cross-sectional shape as shown in FIG. 15, the amplitude SW of the tangentially displaced rocking motion of the endless band saw 24 is, as is the case with the arcuate cutting stroke length, maximum when the arcuate cutting level lies at the center of the stock W, and become minimum as it approaches the start point A or the finish point B. Accordingly, the position of the detector switches 50a and 50b is upwardly shifted with the lowering of the cutting level before the cutting reach of the endless band saw 24 reaches the center of the stock W, but is downwardly shifted with the lowering of the cutting level after the cuttingreach of the endless band saw 24 has moved past the center of the stock W.

Hereinafter, the cutting method according to the second preferred embodiment of the present invention will be described.

In the case of the stock W having a circular cross-sectional shape, as shown in FIG. 15, the cutting stroke length in each arcuate cutting level is relatively small when a portion Wp of the stock W a certain distance deep from the start point A is to be cut and also when a portion Wp' of the stock W left a certain distance inwardly from the finish point B is to be cut. The cutting method according to the second embodiment of the present invention which will be subsequently described is such that, only when that upper and lower portions Wp and Wp' are to be cut, the endless band saw 24 is permitted to effect the cutting in a predetermined posture without being accompanied by the rocking motion.

In the practice of the method according to the second embodiment of the present invention, the vertical downfeed cutting in which the endless band saw 24 assumes a horizontal posture is not effected, but the endless band saw 24 is allowed to assume an upwardly inclined posture in which the leading end of the cutting reach of the eddless band saw 24 with respect to the direction of the travel thereof is upwardly inclined relative to the trailing end thereof, during the cutting process. Nevertheless, during the cutting process, the endless band saw 24 in the upwardly inclined posture is allowed to be downwardly fed without being accompanied by the rocking motion. The cutting effected with the endless band saw 24 in the upwardly inclined posture while being downwardly fed is hereinafter referred to as a "down feed up-cutting" for the purpose of the present invention. For the purpose of causing the endless band saw 24, which has been in the horizontal posture, to assume the upwardly inclined posture, as shown by the phantom line in FIG. 11, simultaneously with the lowering of the transverse brace 8, the band saw support 9 has to be inclined in a predetermined direction at a predetermined angle relative to the transverse brace 8. The inclination of the band saw support 9 is included in one of the opposite directions of the tangentially displaced rocking motion and is, accordingly, readily accomplished by one of the hydraulic cylinder units, for example, the cylinder unit 10b, having its piston rod locked in a projected position. However, prior to the inclination of the band saw support 9, the stepper motor 51 has to be operated to upwardly shift the detector switches 50a and 50b to a predetermined height corresponding to the angle of inclination of the endless band saw 24 so that, when one of the detector switches, that is, the detector switch 50b is activated incontact with the right-hand end of the band saw support 9 then upwardly shifted as a routine of the rocking motion, the electromagnetic switching valve 47 can be allowed to assume the neutral position thereby locking the cylinder unit 10b in position with its piston rod held in the projected position.

Figure 11:
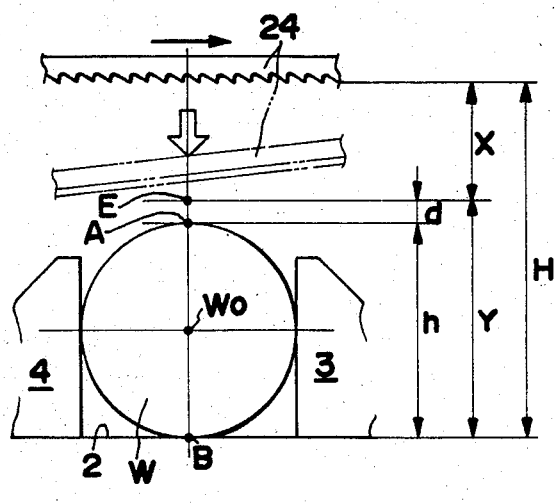
FIG. 11 is a diagram showing the relationship in position of the endless band saw relative to the stock to be cut.

When the cutting reach of the endless band saw 24, while the band saw support 9 is lowered together with the transverse brace 8 in the manner as hereinbefore described, moves past the point E shown in FIG. 11 and subsequently enters the region defined by the distance Y, the speed of the stepper motor 22 is controlled to allow the band saw support 9 to be further lowered at a reduced speed required to effect the down feed cutting. In this way, the down feed up-cutting, i.e., the cutting with the endless band saw 24 in the upwardly inclined posture and being fed downwardly, is carried out to the stock W from the start point A down to the position required to cut only the upper portion Wp as shown in FIG. 15. At this time, as the length of the cutting region 24a of the cutting reach of the endless band saw 24 inserted in the cut line increases progressively, the load acting on the endless band saw 24 increases correspondingly. Accordingly, in order to keep within a permissible tolerance the maximul load imposed on the endless band saw 24 at the time that upper portion Wp is competely cut, the speed of the down feed of the endless band saw 24 has to be adjusted to an appropriate value. This can be accomplished by determining the lowermost limit of the upper portion Wp (or the uppermost limit of the lower portion Wp') in such a way that, in the light of the speed of the down feed of the endless band saw 24 selected, the load acting on the endless band saw 24 will not depart from the permissible tolerance.

During the period subsequent to the completion of the cutting of the upper portion Wp of the stock W and prior to the cutting reach of the endless band saw 24 arriving at the uppermost limit of the lower portion Wp' of the same stock W, the endless band saw 24 undergoes a combination of the tangentially displaced rocking motion and the vertical down feed cutting to cut the stock W depicting the arcuate cutting trace. When the cutting reach of the endless band saw 24 subsequently arrives at the uppermost limit of the lower portion Wp', the down feed up-cutting is again resumed to effect the cutting to the finish point B, thereby completing the cutting of the stock W into pieces.

The upwardly inclined posture assumed by the endles band saw 24 at the time the down feed up-cutting is effected to any one of the uppe and lower portions Wp and Wp' is represented by the angles of inclination of the tangential lines $241_1$ and $241_2$ touching the imaginary arcuate curves CS' at respective points Fu and Fd of intersection between the imaginary arcuate curves CS', which pass through the trailing side of the upper portion Wp with respect to the direction of travel of the cutting reach of the endless band saw 24 and that of the lower portion Wp' with respect to the same, respectively, and the arcuate curves Fc delineated for the purpose of the determination of the control positions F, as shown in FIG. 15. In this case, the intersecting points Fu and Fd provide respective trailing positions of the lower and upper portions Wp and Wp'. Accordingly, when the down feed up-cutting of the portion Wp is finished, the tangentially displaced rocking motion of the endless band saw 24 starts from the condition in which the endless band saw 24 is inclined upwardly with respect to the direction of the leading side of the cutting reach of the endless band saw 24, whereas when the down feed cutting accompanied by the tangentially displaced rocking motion is subsequently finished, the down feed up-cutting of the portion Wp' starts from the condition in which the endless band saw 24 is inclined downwardly with respect to the direction of the leading side of the cutting reach of the endless band saw 24.

Figure 19:
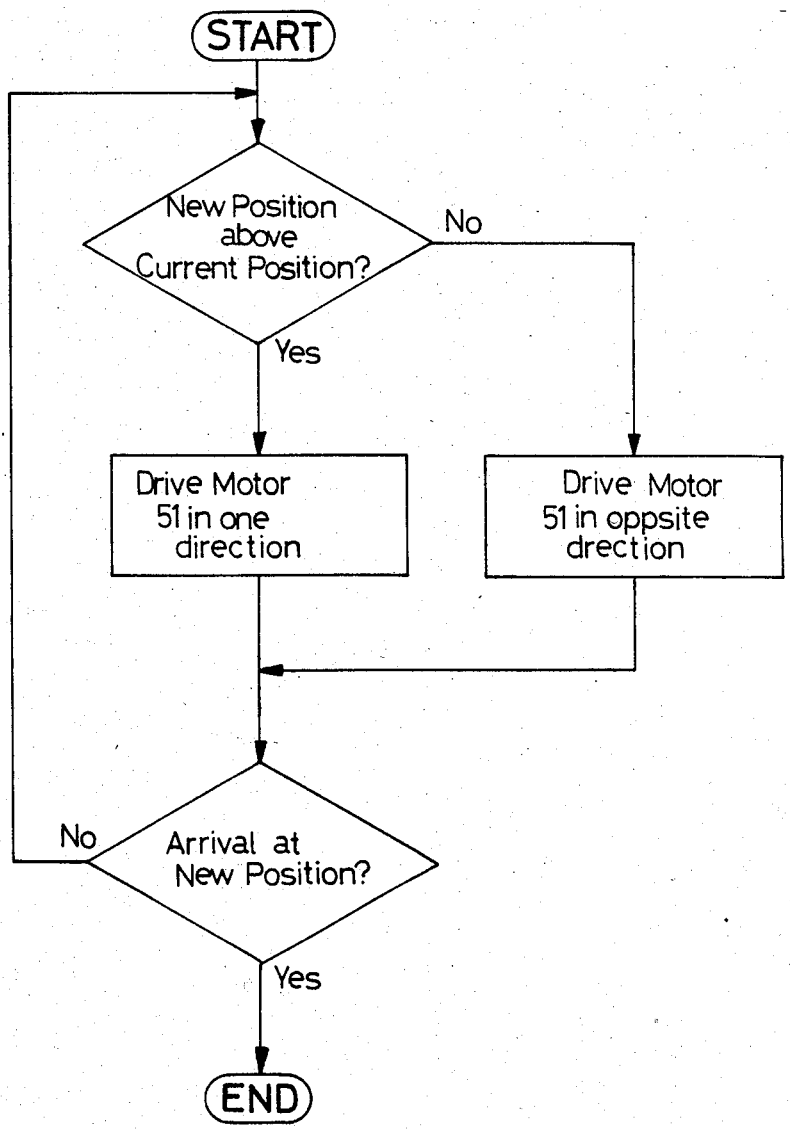

The progress of the cutting operation subjected to the stock W of circular cross-section is illustrated in a time chart of FIG. 16. On the other hand, the procedures necessary to perform the above described cutting method are shown in terms of a flow chart in FIG. 17, it being to be noted that a block of ARCUATE CUTTING CONTROL shown in FIG. 17 is a subroutine performed in a manner as shown in a flow chart of FIG. 18. Also, a block of POSITION CONTROL OF SWITCHES 50a & 50a shown in FIG. 18 is also a subroutine performed in a manner as shown in a flow chart of FIG. 19.

As a matter of practice, the above described cutting method is performed by a automated control system. By way of example, if both the drive motor 22 used to selectively lower and elevate the transverse brace 8 and the stepper motor 51 used to selectively lower and elevate the detector switches 50a and 50b are operatively coupled either directly or indirectly with respective pulse encoders so that pulses generated from these pulse encoders can be subjected to either one of the summation and subtraction during the elevating drive and the other of the summation and subtractionduring the lowering drive, the position of the transverse brace 8 and that of the detector switches 50a and 50b can be digitalized. Accordingly, if the position to which the transverse brace 8 is to be lowered for the control of the down feed cutting and the position to which the detector switches 50a and 50b are to be elevated for the determination of the end of the arcuate cutting stroke are allocated a predetermined count, a digital control of the direction of rotation of the motors 22 and 51 as well as the timing at which the motors 22 and 51 are to be brought to a halt is possible by comparing the respective counts with current counts indicative of the current position of the transverse brace 8 and the detector switches 50a and 50b.

Specifically, the band saw machine according to the present invention may be so designed as to have its sequence of operation controlled by a microcomputer having a program memory in which the distance Fl utilizeable for the determination of the arcuate curves Fc shown inFIG. 15, the depth s of vertical cut at the time of lowering of the cutting level during the arcuate cutting control, the maximum width of the stock that can be cut by the vertical down feed cutting method accompanied no arcuate cutting control, and the type of material used to make the stock to be cut are stored. During the cutting work, the microcomputer will determine whether or not the arcuate cutting control should be performed, in dependence on the size (diameter in the case of the circular cross-sectioned stock or height and width in the case of the rectangular cross-sectioned stock) of the stock W to be cut and the type of material of the stock W both stored in the computer memory. Should the microcomputer determine that the arcuate cutting control should be executed, the microcomputer performs a requisite calculation, by the use of the distance Fl and the depth s of the vertical cut both determined in the light of the size and material of the stock W, to determine various positions necessary for the control of the vertical movement of the transverse brace 8 (such as the points E and A shown in FIG. 11, the trailing position of the upper portion Wp shown in FIG. 15, the trailing position of the lower portion Wp' shown in FIG. 15, and the pitch between the neighbouring arcuate cutting levels) and the position of the detector switches 50a and 50b whic corresponds to the position at which the direction of the rocking motion of the band saw support 9 is to be changed, that is, the control position F at the points Fu and Fd and also at the arcuate cutting level in each stage (the imaginary arcuate curve CS'). Thereafter, the microcomputer stores in its memory a count corresponding to the previously described count of the number of the pulses and, then, controls the machine by the use of the stored count (descriptive of the target stop position) and the pulse count descriptive of the current position.

The fluid circuit for the hydraulic cylinders 46a and 46b shown in FIG. 9 has been described and shown as including the two separate adjustable flow control valves 48a and 48b upstream of the supply pump 49 with respect to the direction of flow of the hydraulic medium towards the cylinders 46a and 46b. However, in the fluid circuit shown inFIG. 20 employs, instead of the two separate flow control valves 48a and 48b shown in FIG. 9, a single flow control valve assembly 57 of a type having a single intake port, fluid-connected to the supply pump 49, and a pair of discharge ports fluid-connected to the respective hydraulic cylinders 46a and 46b, which valve assembly 57 is hereinafter referred to as a "dual flow control valve assembly". The details of the dual flow control valve assembly 57 are best shown in FIGS. 21 and 22, reference to which will now be made.

Figure 21:
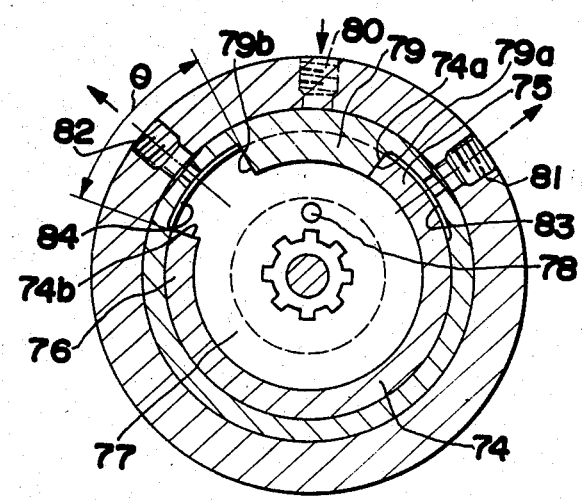
FIGS. 21 and 22 are transverse and longitudinal sectional views, respectively, of the valve assembly.
Figure 22:
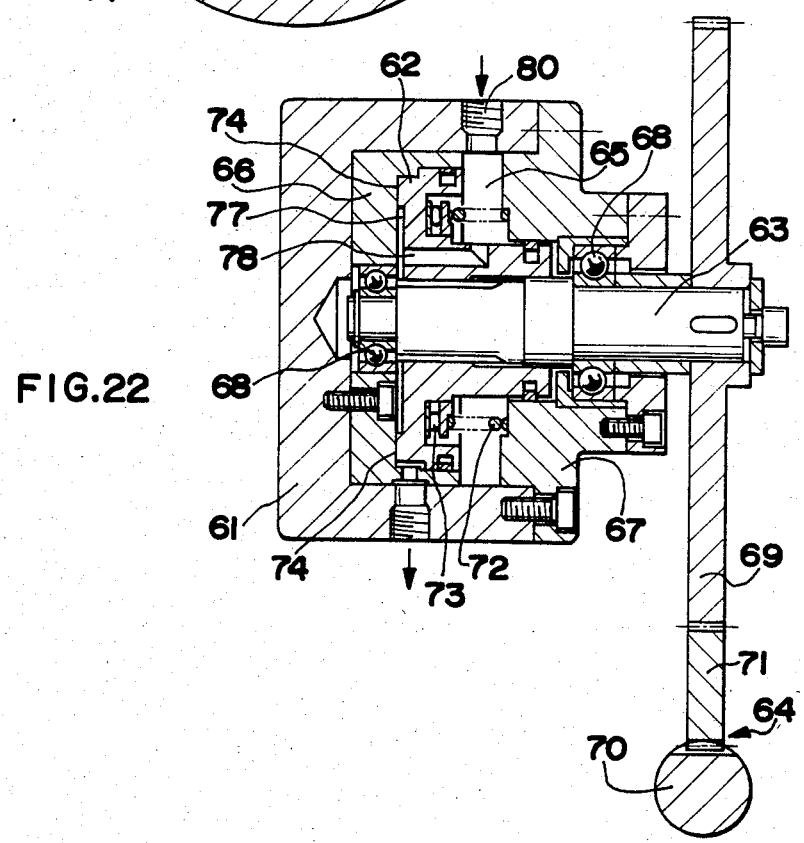

As shown in FIGS. 21 and 22, the intake port is identified by 80 while the discharge ports are identified by 81 and 82, respectively. The valve assembly 57 comprises a valve casing 61 of generally cylindrical cup-like configuration having a rotary valve body 62 rotatably accommodated therein, and a cap 67 closing the opening of the valve casing 61. Within the interior of the valve casing 61, a generally dish-like valve seat member 66 is positioned between the wall of the valve casing 61 and the rotary valve body 62 and is fixed in position inside the valve casing 61 in any suitable manner. The rotary valve body 62 is axially displaceably mounted on a drive shaft 63, but is rotatable together with said drive shaft 63, said drive shaft 63 having one end rotatably supported by a bearing 68 fast with the valve seat member 66 and a portion adjacent the opposite end supported rotatably by a bearing 68 fast with the cap 67. The opposite end of the drive shaft 63 extends outwardly of the valve casing 61 from the cap 67 and has a driven gear 69 rigidly mounted thereon for rotation together therewith. The driven gear 69 is drivingly connected to a drive means, generally identified by 64, including a pinion gear 71 constantly meshed with the driven gear 69, and a rack gear 70 constantly meshed with the pinion gear 71 and is so designed as to rotate the driven gear 69 about the drive shaft 63, and, hence, the rotary valve body 62, as the rack gear 70 is linearly moved in any one of the opposite directions.

The rotary valve body 62 mounted axially displaceably on the drive shaft 63 is integrally formed with an arcuate spacer extending a predetermined distance adjacent and circumferentially of the rotary valve body 62 with its opposite ends 74a and 74b spaced a predetermined angular distance. By the action of a compression spring 72 interposed between the rotary valve body 62 and the cap 67, the rotary valve body 62 is resiliently urged towards the valve seat member 66 with the arcuate spacer projection 74 held in sliding contact with the valve seat member 66. It is, however, to be noted that a thrust bearing 73 is interposed between one end of the compression spring 72 remote from the cap 67 and the rotary valve body 62 while the thrust bearing 73 is so shaped as to provide a spring seat for receiving said one end of the compression spring 72.

In the construction described above, the valve assembly 57 has an annular valve chamber 65, defined between the cap 67 and the rotary valve body 62 and coaxially exteriorly of the drive shaft 63, and a layered chamber 77 defined radially inwardly of the arcuate spacer projection 74 and between the valve body 62 and the valve seat member 66, said layered chamber 77 being communicated with the annular valve chamber 65 through at least one connecting passage 78 which is defined in the rotary valve body 62. While the intake port 80 defined in the valve casing 61 is communicated with the layered chamber 65 at all times, the discharge ports 81 and 82 are selectively communicated with the layered chamber 77 one at a time depending on the position of the rotary valve body 62 in a manner which will now be described.

The valve seat member 66 is, as best shown in FIG. 21, formed on one end face adjacent the rotary valve body 62 with a stopper projection 79 extending adjacent the outer periphery thereof an angular distance about the longitudinal axis of the drive shaft 63 and positioned on the path of movement of the arcuate spacer projection 74. Because of the presence of the stopper projection 79 on the path of movement of the arcuate spacer projection 74, the rotary valve body 62 is rotatable only between a first position, at which one of the opposite ends, for example, the end 74a, of the arcuate spacer projection 74 integral with the rotary valve body 62 is held in contact with one of the opposite ends, for example, one end 79a, of the stopper projection 79 as shown in FIG. 11, and a second position at which the opposite end 74b of the arcuate spacer projection 74 is held in contact with the opposite end 79b of the stopper projection, it being to be noted that, when and so long as the rotary valve body 62 is in any one of the first and second positions, the ends 74a and 79a, or 74b and 79b, of the respective spacer and stopper projections 74 and 79 are spaced a predetermined distance corresponding to a predetermined angle θx about the longitudinal axis of the drive shaft 63 as shown in FIG. 21. On respective sides of the stopper projection 79 integral with the valve seat member 66, the periphery of the valve seat member 66 is formed with a pair of spaced apart recesses 83 and 84 which are in the form of a groove having a width equal to or slightly smaller than the distance of projection of the stopper projection 79 from the valve seat member 66 and a length substantially equal to the space between the ends 74a and 79a, or 74b and 79b, of the respective spacer and stopper projections 74 and 79. The recesses 83 and 84 are in communication with the discharge ports 81 and 82, respectively, said discharge ports 81 and 82 being formed in the valve casing 61. These recesses 83 and 84 are adapted to be closed by portions 75 and 76 of the arcuate spacer projection 74 adjacent the opposite ends 74a and 74b, respectively, when the rotary valve body 62 is in the first position and in the second position. So far shown, the recess 83 is closed by the portion 75 of the arcuate spacer projection 74 because the rotary valve body 62 is shown as assuming the first position, in which condition the communication between the discharge port 81 and the layered chamber 77 through the recess 83 is interrupted. However, when the rotary valve body 62 is rotated to the second position, the recess 84 is closed by the portion 75 with the consequence that the communication between the discharge port 82 and the layered chamber 77 is interrupted.

While the flow control valve assembly 57 is constructed as hereinbefore described, the drive means 64 including the rack gear 70 is so designed that, when the rack gear 70 is driven in one direction by a solenoid unit (not shown), the rotary valve body 62 can be rotated through the predetermined angle $\theta x$. Assuming that the rotary valve body 62 is in the first position in which the end 74a of the arcuate spacer projection 74 is abutted against the end 79a of the stopper projection 79 as shown in FIG. 21, the portion 75 of the arcuate spacer projection 74, which serves as a first shutter member, is in position to close thr recess 83 while the portion 76 of the arcuate spacer projection 74, which serves as a second shutter member, is in position to open the recess 84. Accordingly, the intake port 80 is communicated with the discharge port 82 through the annular valve chamber 65, then the connecting passage 78 and finally through the layered chamber 77.

When the rotary valve body 62 is subsequently rotated to assume the second position from the first position, the recess 83 which has been closed by the first shutter member 75 is gradually opened while the the recess 84 which has been opened is gradually closed by the second shutter member 76. In other words, as the rotary valve body 92 is rotated from the first position towards the second position, the opening of the discharge port 81 communicated with the recess 83 gradually increases while that of the discharge port 82 communicated with the recess 84 correspondingly decreases.

When the rotary valve body 62 is completely rotated to the second position in which the end 74b of the arcuate spacer projection 74 is abutted against the end 79b of the spacer projection 79, the second shutter member 76 closes the recess 84 communicated with the discharge port 82 while the recess 83 communicated with the discharge port 81 is opened. Accordingly, only the discharge port 81 is communicated with the intake port 80 through the recess 83, the layered chamber 77, the connecting passage 78 and the valve chamber 65.

If the rotary valve body 62 is rotated from the second position towards the first position, the opening of the discharge port 82 communicated with the recess 84 gradually increase while the discharge port 81 communicated with the recess 83 correspondingly decreases, with the valve body 62 consequently returning to the condition shown in FIG. 21.

From the foregoing, it is clear that, while the fluid under pressure is constantly supplied to the intake port 80 from the supply pump 49, the rotation of the rotary valve body 62 from the first position towards the second position results in that the flow of the fluid discharged from the discharge port 81 increases from a zero value to a maximum value while the flow of the fluid discharged from the discharge port 82 decreases from a maximum value to a zero value. On the other hand, the rotation of the rotary valve body 62 from the second position towards the first position results in that the flow of the fluid discharged from the discharge port 81 decreases from the maximum value to a zero value while the flow of the fluid discharged from the discharge port 82 increases from the zero value to the maximum value.

Figure 20:
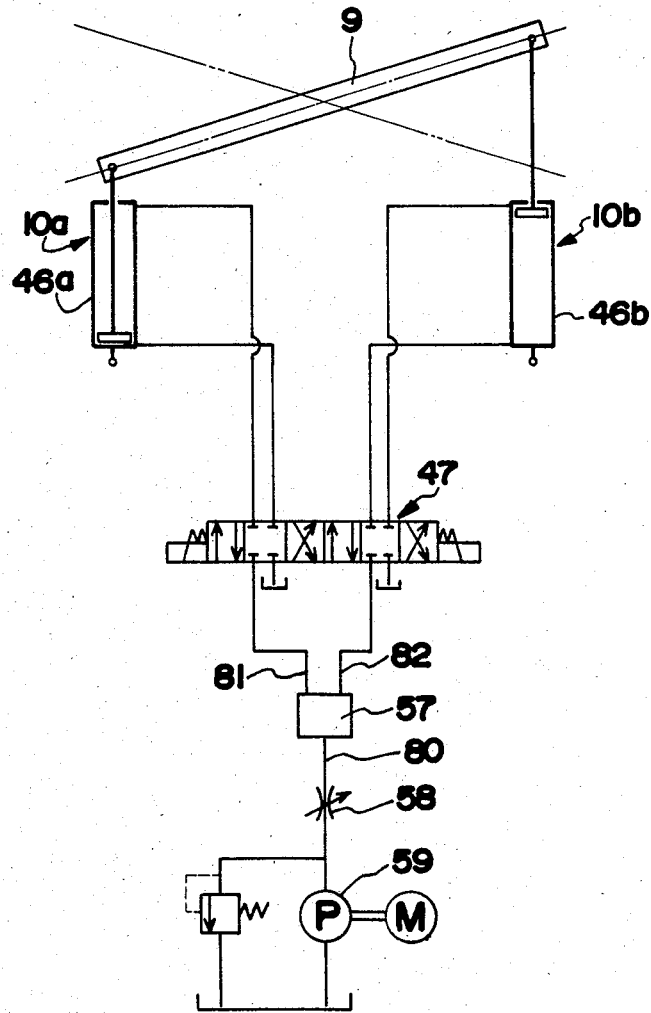
FIG. 20 is a schematic diagram showing a modified fluid circuit employing a single flow control valve assembly.

As shown in FIG. 20, the discharge ports 81 and 82 of the flow control valve assembly 57 are communicated with the cylinders 46a and 46b through the electromagnetic switching valve 47, while the intake port 80 thereof is fluid-connected with the supply pump 49.

Where the band saw machine embodying the present invention employs the fluid circuit shown in FIG. 20 for effecting the rocking motion of the band saw support 9 and, hence, the endless band saw 24, by alternately switching the electromagnetic switching valve 47 over between two different operative positions, the flow control valve assembly 57 automatically adjusts the flow of the fluid medium to be alternately supplied to the cylinders 46a and 46b in such a manner that the speed of one of the opposite ends of the band saw support 9 then upwardly shifted gradually increases while the speed of the other of the opposite ends of the band saw support 9 then downwardly shifted gradually increases. This can readily be accomplished if the solenoid unit for driving the rack gear 70 of the drive means 64 for the flow control valve assembly 57 is operatively associated with the electromagnetic switching valve 47 in such a way that, when the electromagnetic switching valve 47 is in position to communicate the hydraulic cylinder 46a with the discharge port 81 of the valve assembly 57, the rotary valve body 62 is rotated to the second position, but when the electromagnetic switching valve 47 is in position to communicate the hydraulic cylinder 46b with the discharge port 81 of the valve assembly 57, the rotary valve body 62 is rotated to the first position.

It will readily be seen that, if the flow of the fluid medium to be supplied to the hydraulic cylinders 46a and 46b one at a time is automatically controlled in the manner as hereinbefore described, the band saw support 9 can undergo the rocking motion in the manner as hereinbefore described with particular reference to FIG. 10.

Although the present invention has fully been described in connection with the preferred embodiments thereof with reference to the accompanying drawings, it is to be noted that numerous changes and modifications ar readily conceived by those skilled in the art without departing from the scope of the present invention as defined by the appended claims. By way of example, although the rack gear 70 has been described as driven by the solenoid unit, an electrically operated motor may supersede the solenoid unit.

Moreover, although the drive and driven wheels for the support of the endless band saw have been described as rotatable in the inclined plane, they may be rotatable in a plane perpendicular to the stock to be cut.

Such numerous changes and modifications are to be construed as included within the scope of the present invention as defined by the appended claims.

What is claimed is:

1. A method for cutting a stock to be cut by the use of a band saw machine comprising an endless band saw travelling in one direction and having cutting and return reaches between guide wheels over which said endless band saw is trained, the cutting of the stock being effected by causing the endless band saw to undergo a rocking motion generally around the stock while said endless band saw is intermittently fed through a plurality of cutting levels in a direction towards and across the stock, said cutting method being characterized in that, at each of said cutting levels, the cutting of the stock is effected only by feeding the endless band saw downwardly in a vertical direction so as to reach the next succeeding cutting level while the rocking motion of the endless band saw is intermittent with an appropriate timing prior to a trailing end of a cutting zone of a cutting reach of the endless band saw, which is actually used to cut the stock, with respect to the direction of travel of the endless band saw, arriving at one side of the stock being cut, and in that, when and after the cutting reach of the endless band saw has reached the next succeeding cutting level, an arcuate cutting is effected to the stock in the opposite direction.

2. A method for cutting a stock to be cut, said stock having a cross-section of circular shape or the like, said stock having upper, intermediate and lower areas in its cross-sectional representation with respect to the direction of feed of a cutting reach of an endless band, said method comprising the steps of
  cutting the upper area of the stock by feeding the endless band saw downwardly while at least the cutting reach of the endless band saw is held at a predetermined angle relative to the stock;
  cutting the intermediate area of the stock by feeding the endless band saw downwardly intermittently through a plurality of cutting levels while the endless band saw is permitted to undergo a rocking motion generally around the stock in such a manner that, at each of said cutting levels, the rocking motion is intermittent with an appropriate timing prior to a trailing end of a cutting zone of the cutting reach of the endless band saw, which is actually used to cut the stock, with respect to the direction of travel of the endless band saw, arriving at one side of the stock being cut thereby to permit the cutting reach of the endless band saw to reach the next succeeding cutting level, add an arcuate cutting is effected to the stock in the opposite direction after the cutting reach has reached the next succeeding cutting level; and
  cutting the lower area of the stock by feeding the cutting reach of the endless band saw downwardly while the cutting reach of the endless band saw is held at said predetermined angle.

3. A band saw machine which comprises:
a generally elongated frame structure including a pair of spaced apart guide wheels, one of said guide wheels being adapted to be driven in one direction, and an endless band saw trained between the guide wheels and capable of travelling in one direction over the guide wheels during the rotation of said one of the guide wheels, said endless band saw having a cutting reach and a return reach between the guide wheels, said frame structure comprising a transverse brace supported for movement between the inoperative and cutting positions, a drive means for causing the transverse brace to move between the inoperative and cutting positions, and a band saw support carrying the guide wheels, said band saw support being supported by the transverse brace through a self-centering mechanism for angular movement through the predetermined angle in the opposite directions relative to the transverse brace, said self-centering mechansim comprising a pair of spaced apart arcuate surfaces formed in and curved inwardly of the transverse brace adjacent the opposite ends thereof so as to confront with each other, and at least one pair of spaced apart roller units carried by the band saw support, each of said roller units including a roller element and a biasing means for urging the respective roller element outwardly of the band saw support so as to resiliently contact the adjacent arucate surface in the transverse brace; means for fixedly supporting a stock to be cut by the cutting reach of the endless band saw and positioned below the endless band saw, said frame structure being supported for movement relative to said fixedly supporting means between inoperative and cutting positions in a direction generally perpendicular to the stock, said cutting reach of the endless band saw cutting the stock during the movement of the frame structure towards the cutting position while the endless band saw is driven to travel over the guide wheels; a rocking means including a pair of spaced apart, speed-controllable reciprocating drives for rocking the endless band saw through a predetermined angle in the opposite directions with the opposite ends of the frame structure alternately upwardly and downwardly shifted, said rocking means being operable at least during the cutting operation performed by the cutting reach of the endless band saw to the stock; and wherein said reciprocating drives are operatively coupled and positioned between the transverse brace and the band saw support for rocking the endless band saw together with the band saw support.

4. A band saw machine as claimed in claim 3, wherein said fixedly supporting means comprises a vise including a fixed vise jaw, rigidly mounted on a bench of the machine, and a movable vise jaw mounted on the machine bench for movement in a direction close to and away from the fixed vise jaw, and a second drive means for causing the movable vise jaw in the direction close to and away from the fixed vise jaw, and wherein said frame structure is mounted on a carriage supported by the machine bench and adapted to be moved by a third drive means in a direction parallel to the direction of movement of the movable vise jaw, said fixedly supporting means also comprising a movable member operatively coupled with said second drive means for movement in a direction parallel to the direction of movement of the carriage at a speed twice higher than the speed of movement of the carriage, an operating member secured to the movable vise jaw and positioned adjacent the movable member, and means for detecting the position of the movable vise jaw relative to the movable member, whereby when the center of that cutting zone of the endless band saw which is actually used to cut the stock deviates from the alignment with a point intermediate between the fixed and movable vise jaws, said detecting means assumes a state different from that assumed thereby when the center of the cutting zone align with the point intermediate between the fixed and movable vise jaws.

5. A band saw machine which comprises:

a generally elongated frame structure including a pair of spaced apart guide wheels, one of said guide wheels being adapted to be driven in one direction, and an endless band saw trained between the guide wheels and capable of travelling in one direction over the guide wheels during the rotation of said one of the guide wheels, said endless band saw having a cutting reach and a return reach between the guide wheels;

means for fixedly supporting a stock to be cut by the cutting reach of the endless band saw and positioned below the endless band saw, said frame structure being supported for movement relative to said fixedly supporting means between inoperative and cutting positions in a direction generally perpendicular to the stock, said cutting reach of the endless band saw cutting the stock during the movement of the frame structure towards the cutting position while the endless band saw is driven to travel over the guide wheels; and a rocking means including a pair of spaced apart, speed-controllable reciprocating drives for rocking the endless band saw through a predetermined angle in the opposite directions with the opposite ends of the frame structure alternately upwardly and downwardly shifted, said rocking means being operable at least through the cutting operation performed by the cutting reach of the endless band saw to the stock, each of said reciprocating drives comprising a fluid-operated cylinder; and a fluid circuit extending between a source of fluid under pressure and both of the cylinders for operating said cylinders alternately and a flow control valve assembly interposed between the fluid source and the cylinders, said flow control valve comprising a valve casing having a fluid intake port means, communicated with the fluid source, and first and second discharge port means communicated respectively with the cylinders, said flow control valve assembly also comprising a rotary valving means housed within the valve casing for rotation through a limited angle between first and second positions spaced angularly from each other, said rotary valving means having first and second shutter members, said first discharge port means being closed by said first shutter member when the rotary valving means is rotated to the first position, but said second discharge port means being closed by said second shutter member when the rotary valving means is rotated to the second position, the opening one of the first and second discharge port means and that of the other of the first and second discharge port means being gradually increased and decreased, respectively, during the rotation of the rotary valving means between the first and second positions.

6. A band saw machine as claimed in claim 5, further comprising a pair of detectors alternately activated by the opposite ends, or actuating members connected to the opposite ends, of the frame structure as a result of the rocking motion of such frame structure, respectively, said detectors being utilized to interrupt the rocking motion of the frame structure when one of said detectors is activated by the corresponding end or actuating member of the frame structure, and means for adjusting the position of both of said detectors in a direction generally parallel to the direction of movement of the frame structure.

* * * * *